US011097679B2

(12) United States Patent
Sakai et al.

(10) Patent No.: US 11,097,679 B2
(45) Date of Patent: Aug. 24, 2021

(54) VEHICLE BODY REAR STRUCTURE

(71) Applicant: HONDA MOTOR CO., LTD., Tokyo (JP)

(72) Inventors: Kazuhiro Sakai, Wako (JP); Tadashi Hirakawa, Wako (JP); Takashi Yamada, Wako (JP); Satoru Noguchi, Wako (JP); Seiichi Kato, Wako (JP); Kanji Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 16/568,824

(22) Filed: Sep. 12, 2019

(65) Prior Publication Data

US 2020/0101914 A1 Apr. 2, 2020

(30) Foreign Application Priority Data

Sep. 27, 2018 (JP) .............................. JP2018-182748

(51) Int. Cl.
*B62D 21/03* (2006.01)
*B62D 21/15* (2006.01)
(Continued)

(52) U.S. Cl.
CPC .............. *B60R 19/34* (2013.01); *B62D 21/03* (2013.01); *B62D 21/155* (2013.01); *B62D 25/08* (2013.01)

(58) Field of Classification Search
CPC .... B62D 21/11; B62D 21/152; B62D 21/155; B62D 25/08; B62D 21/03; B60R 19/34; B60R 19/36
See application file for complete search history.

(56) References Cited

U.S. PATENT DOCUMENTS 9,216,768 B1 * 12/2015 Dressel ................ B62D 25/082
2011/0215617 A1 * 9/2011 Izutsu ................... B62D 21/152
296/203.04
(Continued)

FOREIGN PATENT DOCUMENTS

| JP | H02241882 A | 9/1990 |
| JP | H0737863 U | 7/1995 |

(Continued)

OTHER PUBLICATIONS

Notice of Reasons for Refusal for Japanese Patent Application No. 2018-182748 dated Apr. 28, 2020; 10 pp.

*Primary Examiner* — Gregory A Blankenship
(74) *Attorney, Agent, or Firm* — Armstrong Teasdale LLP

(57) ABSTRACT

A vehicle body rear structure includes: a pair of left and right rear side frames extending in a fore-and-aft direction in a rear part of a vehicle; a rear subframe attached to the rear side frames; and a pair of left and right shock-absorbing structures respectively provided at rear ends of the rear side frames and extending rearward. The rear subframe includes a pair of left and right rear subframe longitudinal members extending in the fore-and-aft direction and a rear subframe cross member extending laterally and joined to the left and right rear subframe longitudinal members. The rear subframe cross member includes a protrusion that protrudes rearward in a laterally central part thereof. A rear end of the protrusion is positioned more rearward than the rear ends of the rear side frames and more forward than rear ends of the shock-absorbing structures.

9 Claims, 21 Drawing Sheets

(51) Int. Cl.
*B62D 25/08* (2006.01)
*B60R 19/34* (2006.01)

(56) References Cited

U.S. PATENT DOCUMENTS

| | | | | |
|---|---|---|---|---|
| 2013/0249243 | A1* | 9/2013 | Lee | B62D 25/082 |
| | | | | 296/187.03 |
| 2013/0307288 | A1* | 11/2013 | Wavde | B60R 19/34 |
| | | | | 296/187.05 |
| 2016/0052556 | A1* | 2/2016 | Kano | B62D 21/155 |
| | | | | 296/187.08 |
| 2016/0245357 | A1* | 8/2016 | Cazes | F16F 7/003 |
| 2017/0217393 | A1* | 8/2017 | Mohapatra | F16F 7/12 |
| 2018/0148097 | A1* | 5/2018 | Cha | B62D 25/08 |
| 2018/0237076 | A1* | 8/2018 | Perlo | B60K 1/02 |
| 2019/0047392 | A1* | 2/2019 | Jarocki | B60K 1/04 |
| 2019/0077348 | A1* | 3/2019 | Coppuck | B60R 19/34 |
| 2019/0283561 | A1* | 9/2019 | Battaglia | B62D 21/155 |
| 2019/0323574 | A1* | 10/2019 | Suzuki | B29C 70/023 |
| 2019/0375355 | A1* | 12/2019 | Maeda | B21D 39/20 |
| 2020/0079433 | A1* | 3/2020 | Suzuki | B60K 1/04 |
| 2020/0101879 | A1* | 4/2020 | Sakai | B60N 2/012 |
| 2020/0101914 | A1* | 4/2020 | Sakai | B62D 21/03 |
| 2020/0102011 | A1* | 4/2020 | Noguchi | B62D 21/11 |
| 2020/0162014 | A1* | 5/2020 | Gisep | H02S 20/23 |
| 2020/0172167 | A1* | 6/2020 | Watanabe | B62D 27/02 |
| 2020/0231216 | A1* | 7/2020 | Choi | B62D 21/11 |
| 2020/0369140 | A1* | 11/2020 | McCarron | B60K 17/06 |
| 2020/0385058 | A1* | 12/2020 | Kubota | B62D 25/2027 |

FOREIGN PATENT DOCUMENTS

| | | |
|---|---|---|
| JP | 2004330855 A | 11/2004 |
| JP | 2011116250 A | 6/2011 |
| JP | 2011143871 A | 7/2011 |
| JP | 2013159132 A | 8/2013 |
| JP | 2016043829 A | 4/2016 |
| JP | 2017019458 A | 1/2017 |

* cited by examiner

VEHICLE BODY REAR STRUCTURE

TECHNICAL FIELD

The present invention relates to a vehicle body rear structure including a rear subframe.

BACKGROUND ART

As a vehicle body rear structure of a four-wheel vehicle, there is known a structure including a pair of left and right rear side frames extending in the fore-and-aft direction and a rear subframe attached to the underside of the rear side frames (see JP2011-143871A, for example). The rear subframe supports an engine and a power generator and has a function of dispersing or absorbing the collision load at the time of a rear collision of the vehicle.

However, in the prior art structure, a load caused in a relatively light rear collision is transmitted to the rear subframe supporting the wheels and the driving source, and the load transmitted to the rear subframe may cause deformation of the rear subframe. If the rear subframe deforms, it becomes difficult to continue to use the vehicle and a high repair cost may become necessary. Therefore, it is desired that the collision load is transmitted to the rear subframe when the collision load is large, and the collision load is not transmitted to the rear subframe when the collision load is small.

SUMMARY OF THE INVENTION

In view of the above background, a primary object of the present invention is to provide a vehicle body rear structure that can prevent a load in a rear collision from being easily transmitted to the rear subframe when the load is small.

To achieve the above object, one embodiment of the present invention provides a vehicle body rear structure (1), comprising: a pair of left and right rear side frames (71) extending in a fore-and-aft direction in a rear part of a vehicle (2); a rear subframe (72) attached to the rear side frames; and a pair of left and right shock-absorbing structures (130) respectively provided at rear ends of the rear side frames and extending rearward, wherein the rear subframe includes a pair of left and right rear subframe longitudinal members (91) extending in the fore-and-aft direction and a rear subframe cross member (93) extending laterally and joined to the left and right rear subframe longitudinal members, the rear subframe cross member includes a protrusion (93L) that protrudes rearward in a laterally central part thereof, and a rear end of the protrusion is positioned more rearward than the rear ends of the rear side frames and more forward than rear ends of the shock-absorbing structures.

Thereby, the rear subframe cross member receives the load at the protrusion thereof after the shock-absorbing structures absorb the load. Therefore, a relatively small collision load is absorbed by the shock-absorbing structures and is prevented from being easily transmitted to the rear subframe. Thus, the deformation of the rear subframe is suppressed. On the other hand, when the collision load is large, the load is transmitted from the protrusion to the rear subframe so that the load applied to the rear side frames can be dispersed.

Preferably, each shock-absorbing structure includes a first shock-absorbing member (131) extending rearward from the rear end of the corresponding rear side frame and a second shock-absorbing member (132) extending rearward from the rear end of the corresponding rear side frame and having a fore-and-aft strength higher than that of the first shock-absorbing member, rear ends of the second shock-absorbing members are positioned more forward than rear ends of the first shock-absorbing members, and the rear end of the protrusion is positioned more forward than the rear ends of the second shock-absorbing members.

Thereby, a relatively small collision load can be absorbed by the first shock-absorbing members. On the other hand, when the collision load is large, the load can be absorbed by the rear side frames and the second shock-absorbing members.

Preferably, each first shock-absorbing member consists of a crash box extending rearward from the rear end of the corresponding rear side frame and having a rear end joined to a laterally extending bumper beam (133).

Thereby, the bumper beam can receive the load input from various positions on either lateral side of the vehicle rear end, and the load input to the bumper beam can be transmitted to the first shock-absorbing members.

Preferably, the vehicle body rear structure further comprises a driving source (75) for driving the rear wheels, the driving source being mounted on an upper side of the rear subframe, wherein upper ends of the shock-absorbing structures are positioned higher than a lower end of the driving source, and lower ends of the shock-absorbing structures are positioned lower than an upper end of the driving source.

Thereby, the shock-absorbing structures positioned more rearward than the driving source can receive the load from the rear so that the load is prevented from acting on the driving source.

Thus, according to one embodiment of the present invention, there is provided a vehicle body rear structure that can prevent a load in a rear collision from being easily transmitted to the rear subframe when the load is small.

DESCRIPTION OF THE PREFERRED EMBODIMENT(S)

In the following, a vehicle body structure according to an embodiment of the present invention will be described. In the following description, the fore-and-aft direction, the lateral direction (vehicle widthwise direction), and the vertical direction are defined with respect to the vehicle. "Laterally inward (vehicle widthwise inner side)" indicates a direction toward the center of the vehicle in the lateral direction, and "laterally outward (vehicle widthwise outer side)" indicates a direction away from the center of the vehicle in the lateral direction. The frames, panels, and other members constituting the vehicle body structure are made of steel unless otherwise mentioned.

Figure 1:
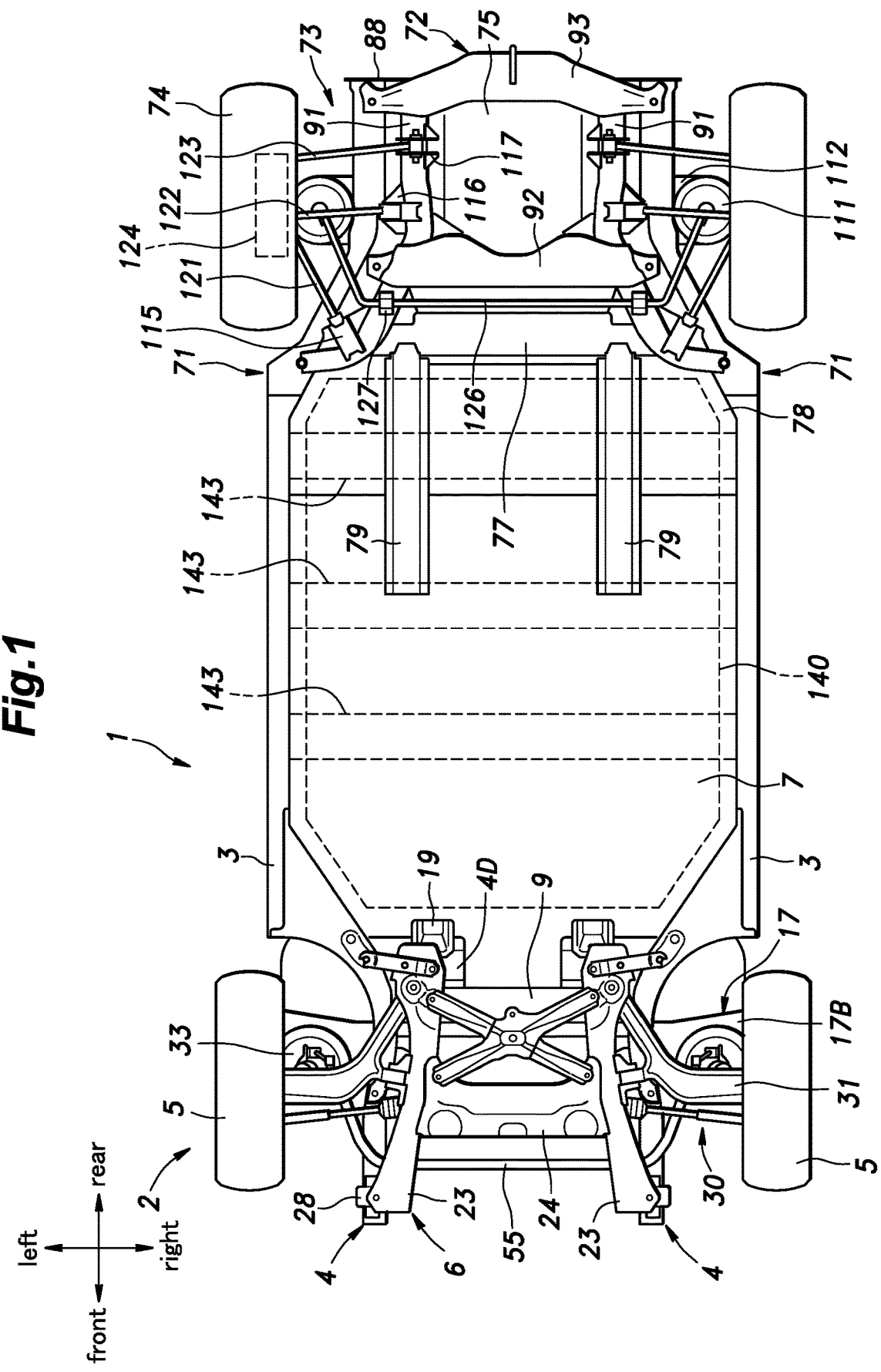
FIG. 1 is a bottom view of a vehicle body structure according to an embodiment of the present invention.
Figure 2:
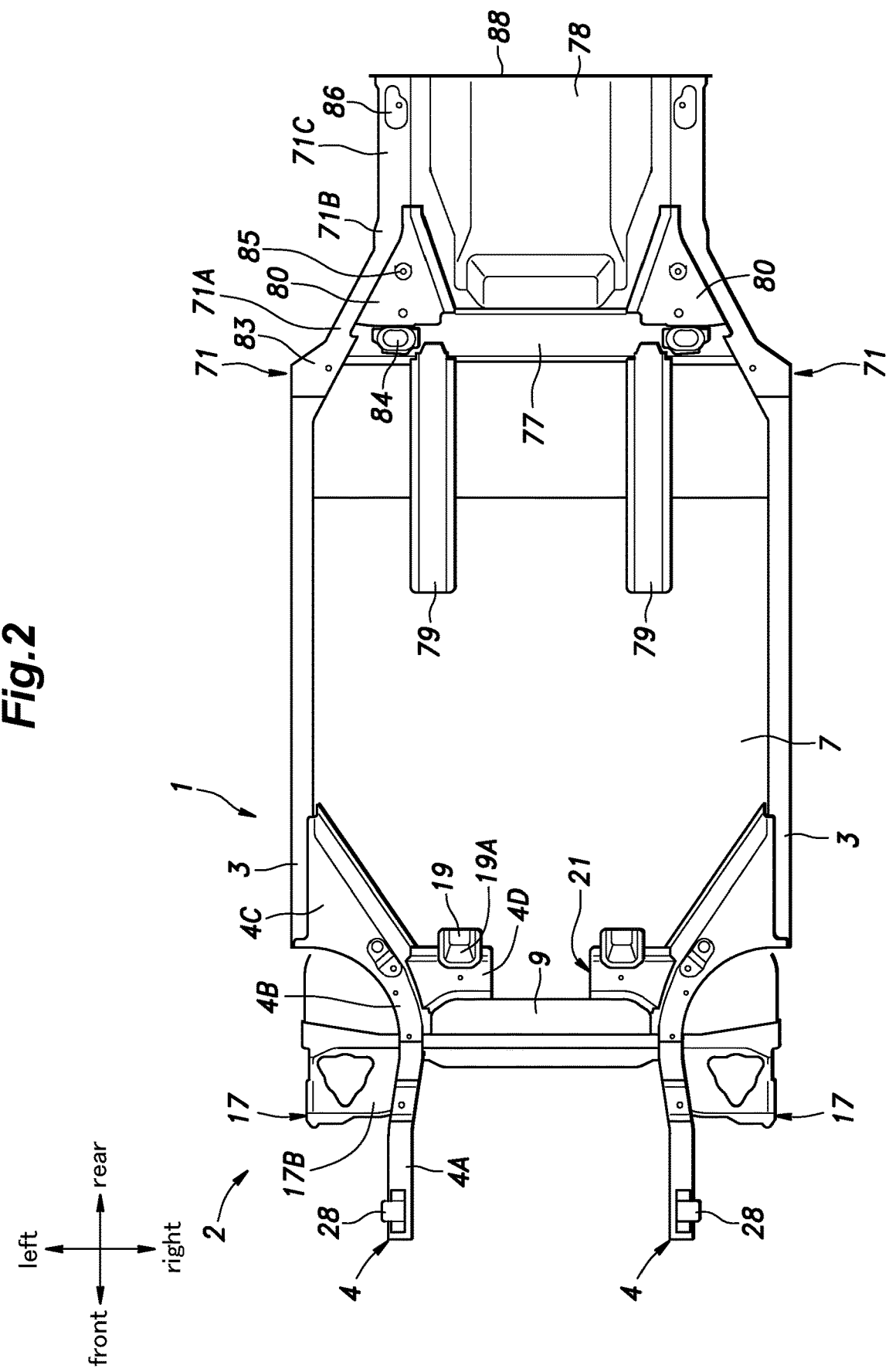
FIG. 2 is a bottom view of the vehicle body structure with a front subframe and a rear subframe being omitted.

As shown in FIGS. 1 and 2, the vehicle body structure 1 includes a pair of left and right side sills 3 extending in the fore-and-aft direction on either lateral side of a lower part of the vehicle 2, a pair of left and right front side frames 4 extending in the fore-and-aft direction in a front part of the vehicle 2 and having rear ends connected to the front ends of the respective side sills 3, and a front subframe 6 attached to the underside of the front side frames 4 and supporting front wheels 5.

Figure 3:
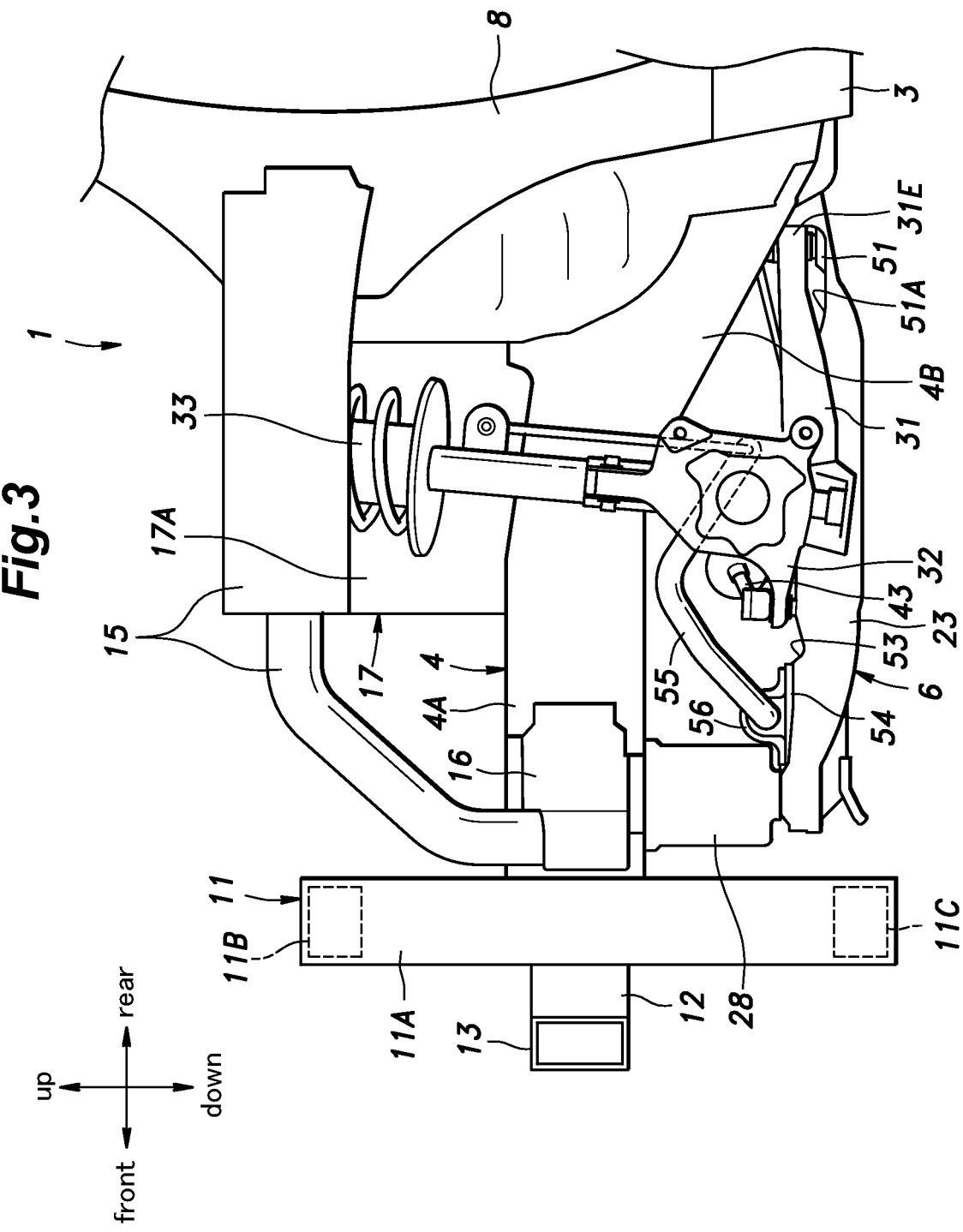
FIG. 3 is a side view of a front part of the vehicle body structure.

A front floor panel 7 is provided on the upper side of the left and right side sills 3 so as to extend between the side sills 3 and has a vertically facing surface. As shown in FIG. 3, a pair of left and right front pillars 8 are provided at the front ends of the left and right side sills 3, respectively. Each front pillar 8 extends vertically and has a lower end joined to the front end of the corresponding side sill 3. As shown in FIGS. 1 and 2, a dash panel 9 is provided between the left and right front pillars 8 so as to have a surface facing in the fore-and-aft direction. The dash panel 9 has left and right side edges joined to the left and right front pillars 8, respectively, and has a lower edge joined to a front edge of the front floor panel 7.

As shown in FIGS. 1 to 4, the left and right front side frames 4 includes front side frame front parts 4A extending in the fore-and-aft direction at positions laterally inward of and above the left and right side sills 3, front side frame middle parts 4B extending rearward and downward from the rear ends of the respective front side frame front parts 4A, and the front side frame inclined parts 4C (outriggers) extending rearward and laterally outward from the rear ends of the respective front side frame middle parts 4B and connected to the front ends of the corresponding side sills 3.

Each front side frame middle part 4B has a hat-shaped cross-section opening upward and is joined to a front face of a lower part of the dash panel 9 so as to form a closed section structure in cooperation with the dash panel 9. Each front side frame inclined part 4C has a hat-shaped cross-section opening upward and is joined to a lower surface of the front floor panel 7 so as to form a closed section structure in cooperation with the front floor panel 7. Each front side frame inclined part 4C has a fore-and-aft width that increases gradually toward the laterally outward direction and has a laterally outer end joined to a laterally inner surface of the corresponding side sill 3.

As shown in FIG. 3, a bulkhead 11 is provided at the front ends of the front side frame front parts 4A. The bulkhead 11 includes a pair of left and right bulkhead side members 11A extending vertically, a bulkhead upper member 11B extending laterally and connecting the upper ends of the left and right bulkhead side members 11A, and a bulkhead lower member 11C extending laterally and connecting the lower ends of the left and right bulkhead side members 11A, whereby the bulkhead 11 is formed in a rectangular frame shape. The front end of each front side frame front part 4A is joined to a vertically middle part of a rear surface of the corresponding bulkhead side member 11A.

A front bumper beam 13 extending laterally is attached to the left and right bulkhead side members 11A via left and right front crash boxes 12 serving as shock-absorbing members, respectively. Each front crash box 12 is formed in a tubular shape extending in the fore-and-aft direction, having a rear end joined to a vertically middle part of the corresponding bulkhead side member 11A, and having a front end joined to a rear side of the front bumper beam 13. The front crash boxes 12 have fore-and-aft stiffness lower than that of the front side frames 4, the front bumper beam 13, and the bulkhead 11, and when a load in a frontal collision is applied thereto, undergoes deformation earlier than the front side frames 4, the front bumper beam 13, and the bulkhead 11 to absorb the impact.

An upper part of each front pillar 8 is provided with a front upper member 15 which extends forward and then extends forward and downward. Each front upper member 15 is positioned laterally outward and above the corresponding front side frame front part 4A. The front end of each front upper member 15 is joined to the front end portion of the corresponding front side frame front part 4A via a laterally extending connecting member 16. Further, a front damper housing 17 is provided between the front side frame front part 4A and the front upper member 15 on each lateral side. Each front damper housing 17 includes a vertical wall 17A extending upward from a rear part of the front side frame front part 4A and an upper wall 17B extending laterally outward from an upper end of the vertical wall 17A and having a laterally outer end joined to the front upper member 15.

Figure 4:
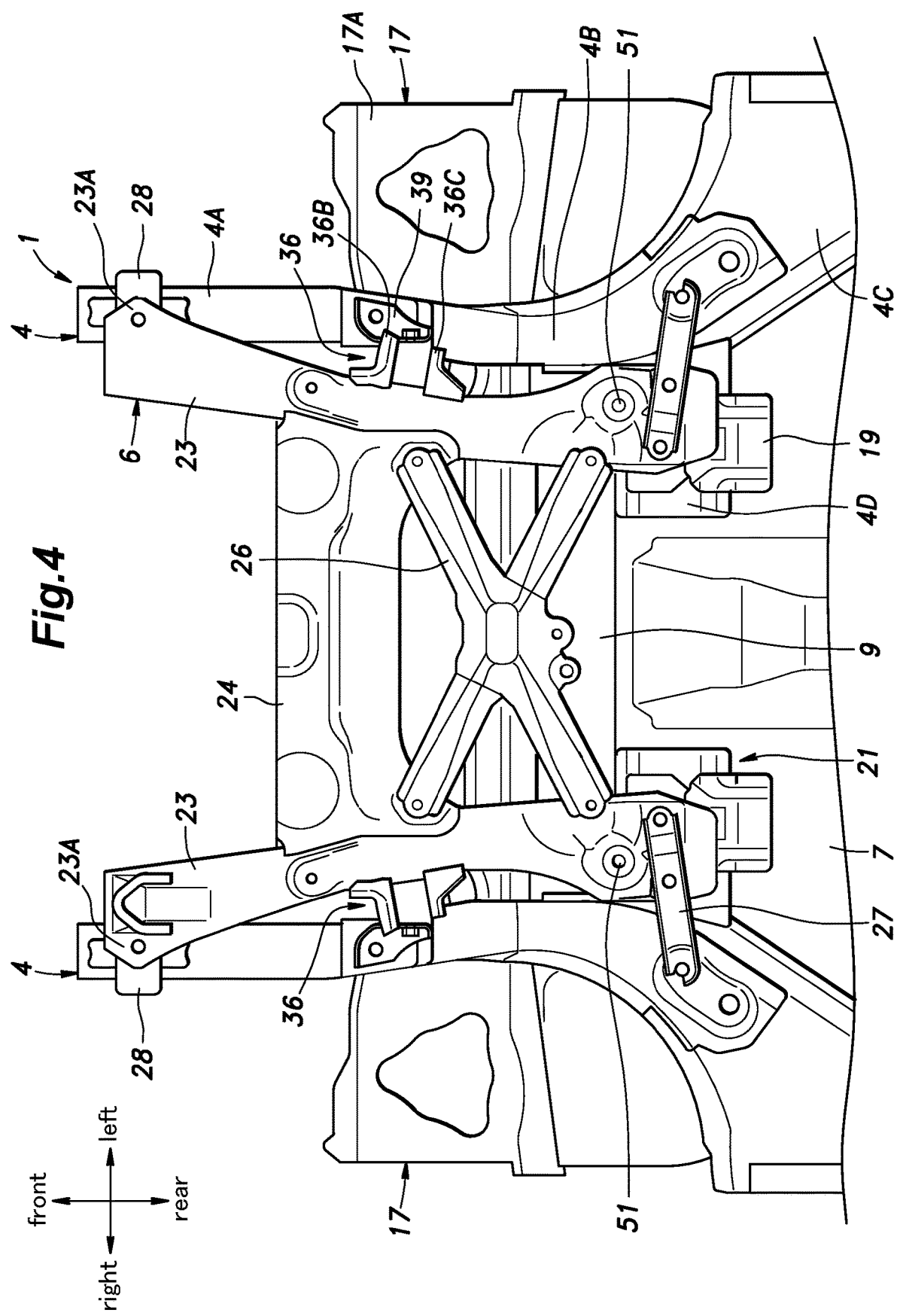
FIG. 4 is a bottom view of the front part of the vehicle body structure.

As shown in FIG. 4, each of the left and right front side frame middle parts 4B is provided with a lateral extension 4D that extends laterally. The laterally inner ends of the left and right lateral extensions 4D laterally oppose each other via a gap. The laterally outer end of each of the left and right lateral extensions 4D is joined to an inner surface of the corresponding front side frame middle part 4B. Each lateral extension 4D has a hat-shaped cross-section opening upward and forms a closed section structure in cooperation with the front floor panel 7. Each lateral extension 4D constitutes a part of the corresponding front side frame 4.

Figure 7:
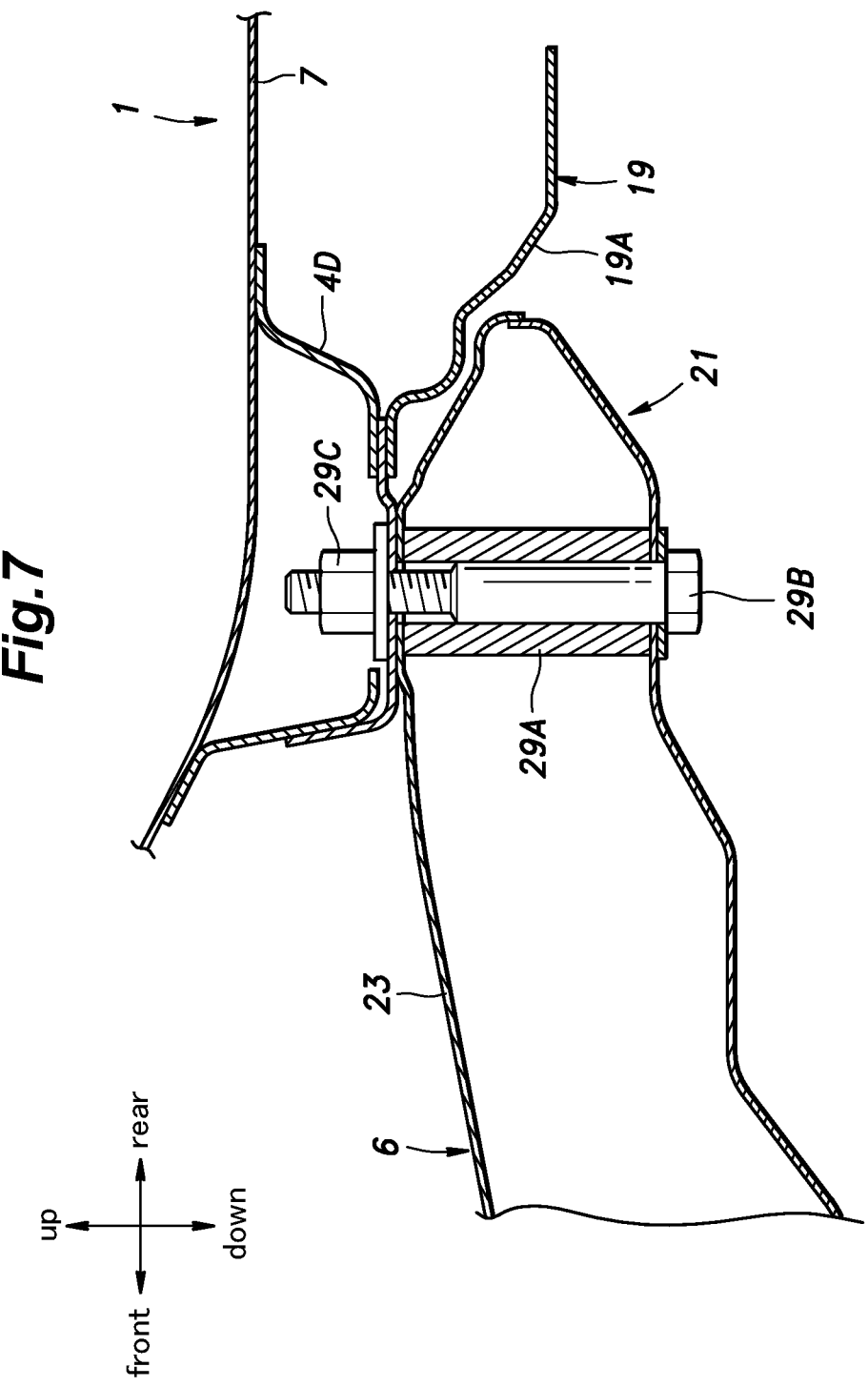
FIG. 7 is a sectional view showing a fastening structure between a rear end portion of a front longitudinal member of the front subframe and a rear-end support.

As shown in FIGS. 4 and 7, a guide member 19 is provided on a laterally inner end of each lateral extension 4D. Each guide member 19 extends rearward from the lower surface of the laterally inner end of the corresponding lateral extension 4D. The guide member 19 is provided, in a front lower part thereof, with a slanted surface 19A that is slanted downward toward the rear. Each lateral extension 4D and the corresponding guide member 19 constitute a rear-end support 21 that supports the rear end of the front subframe 6. Each lateral extension 4D serves as a fastening seat to which the rear end of the front subframe 6 is fastened.

Figure 5:
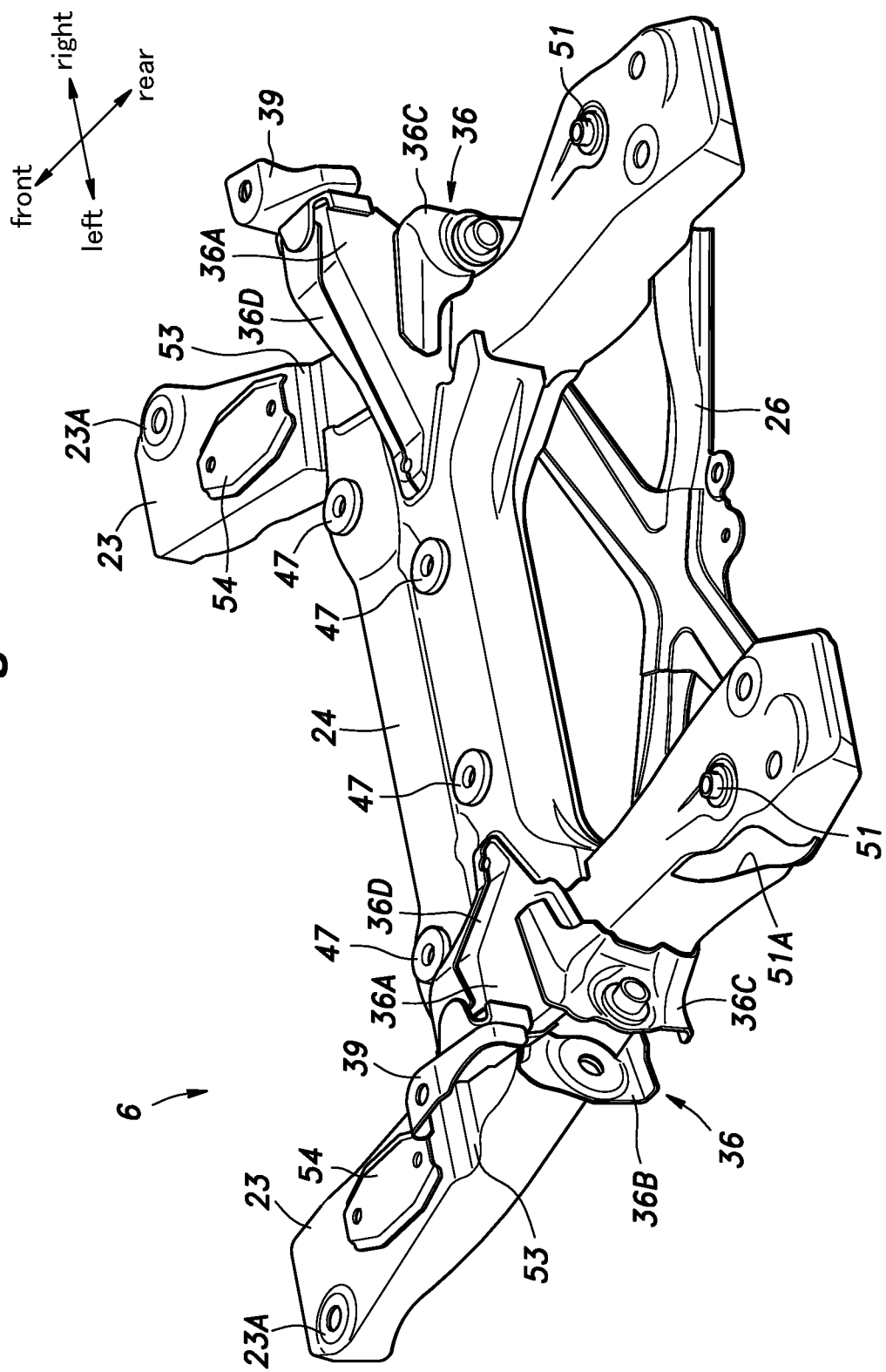
FIG. 5 is a perspective view of the front subframe.

As shown in FIGS. 4 and 5, the front subframe 6 includes a pair of left and right front longitudinal members 23 extending in the fore-and-aft direction and a front cross member 24 extending laterally to be joined to each of the front longitudinal members 23. The left and right front longitudinal members 23 extend obliquely laterally inward toward the rear so as to approach each other toward the rear. Further, the laterally outer edge of each front longitudinal member 23 is curved such that the fore-and-aft central part thereof is recessed laterally inward.

The left and right end portions of the front cross member 24 are respectively joined to fore-and-aft middle portions of the front longitudinal members 23. The left and right end portions of the front cross member 24 are respectively joined to portions of the front longitudinal members 23 slightly forward of the fore-and-aft centers thereof. The front longitudinal members 23 and the front cross member 24 each have a closed cross-section. The front edge (front end) of the front cross member 24 is formed laterally straight. The rear edge of the front cross member 24 has left and right end portions extending rearward and laterally outward in an oblique manner. Thereby, the front cross member 24 has a fore-and-aft width that increases gradually toward the laterally outward direction.

Behind the front cross member 24, a brace 26 is provided which extends laterally to connect the left and right front longitudinal members 23. The brace 26 has an X shape in plan view and includes portions extending from the central part thereof in the front left direction, front right direction, rear left direction, and rear right direction. The front left and right end portions of the brace 26 are joined to the left and right ends of the front cross member 24, respectively, and the rear left and right end portions of the brace 26 are joined to the left and right front longitudinal members 23, respectively. The brace 26 is preferably formed of a steel sheet having a vertically facing surface.

As shown in FIG. 4, the front end of each front longitudinal member 23 is positioned below the corresponding front side frame front part 4A to be slightly offset from the same laterally inward. Specifically, a laterally outer part of the front end of the front longitudinal member 23 is positioned to overlap a laterally inner part of the front end the front side frame front part 4A in plan view. Each front longitudinal member 23 includes, in the front end portion thereof, a front end attachment portion 23A attached to the corresponding front side frame 4. The front end attachment portion 23A is provided in a laterally outer part of the front end of the front longitudinal member 23. The front end attachment portion 23A of each front longitudinal member 23 and the front end of the corresponding front side frame front part 4A are connected to each other by a front connecting member 28 that extends vertically. Specifically, each front longitudinal member 23 is fastened to the lower end of the corresponding front connecting member 28 by a bolt passed therethrough from below. Each front connecting member 28 constitutes a front-end support that supports the front end of the front subframe 6. In the present embodiment, the front end attachment portion 23A is attached to the front side frame front part 4A indirectly via the front connecting member 28. In another embodiment, the front end attachment portion 23A may be attached to the front side frame front part 4A directly without the front connecting member 28 interposed therebetween.

The rear end of each front longitudinal member 23 is positioned below the corresponding lateral extension 4D. Namely, the rear end of each front longitudinal member 23 is positioned more laterally inward than the corresponding front side frame middle part 4B. As shown in FIG. 7, the rear end of each front longitudinal member 23 is provided with a collar 29A that vertically extends therethrough. The rear end of the front longitudinal member 23 is fastened to the lower surface of the lateral extension 4D by a bolt 29B passed through the collar 29A from below and threadably engaged with a nut 29C joined to the lateral extension 4D. The rear end of the front longitudinal member 23 protrudes more rearward than the lateral extension 4D, and the rear edge thereof extends laterally. Further, the rear end of the front longitudinal member 23 is provided with a vertical width (vertical thickness) that decreases gradually toward the rear.

The rear end of the front longitudinal member 23 opposes the slanted surface 19A of the guide member 19 via a gap in the fore-and-aft direction. Further, in plan view, the rear end of the front longitudinal member 23 is positioned to overlap the slanted surface 19A of the guide member 19.

As shown in FIG. 4, the lower surface of each rear end of the front longitudinal member 23 is connected to the lower surface of the corresponding front side frame middle parts 4B by a plate-shaped connecting member 27. The connecting member 27 deforms when applied with a load equal to or greater than a predetermined load to release the connection between the front longitudinal member 23 and the front side frame middle part 4B.

Figure 8:
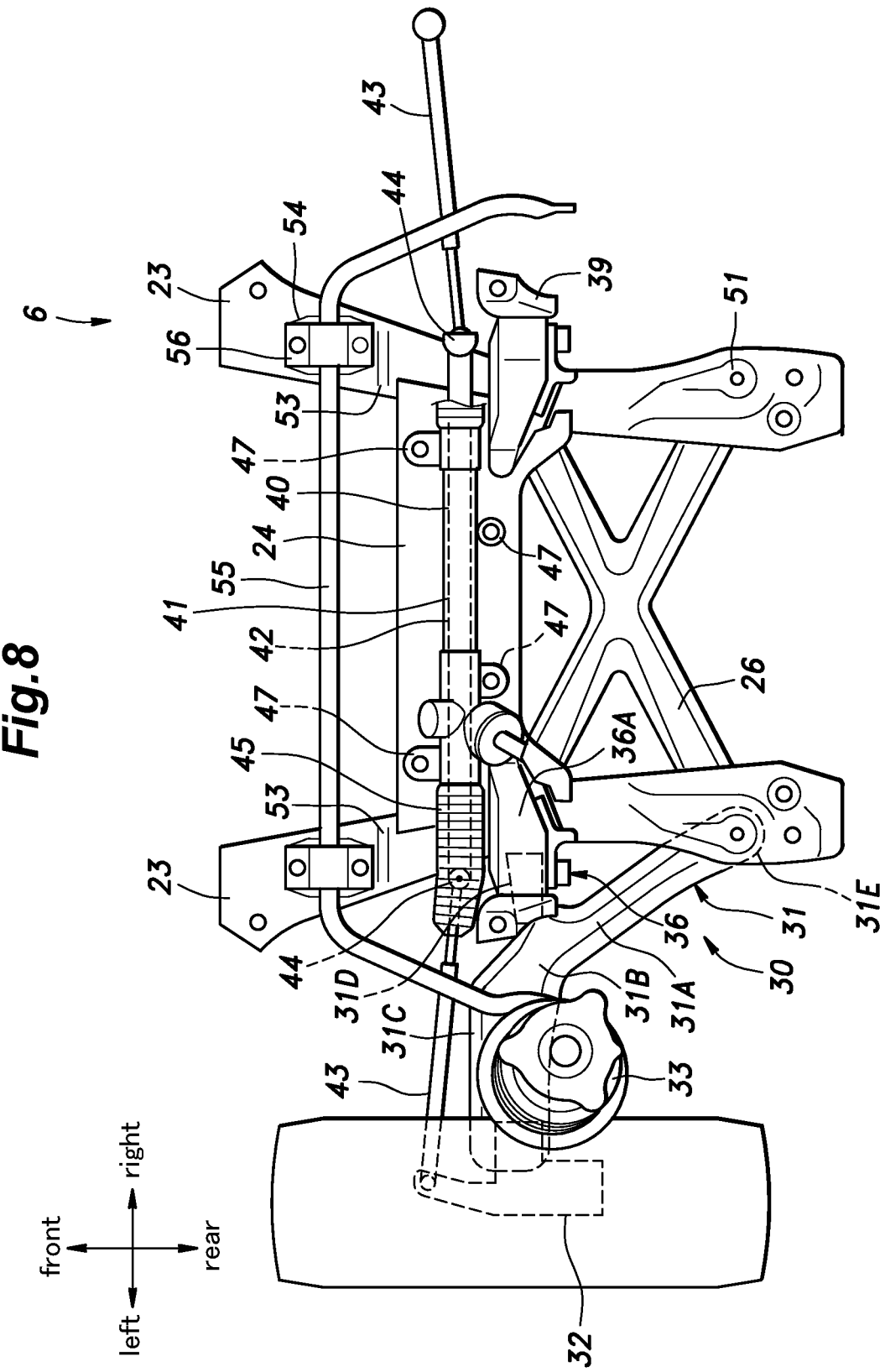
FIG. 8 is a plan view showing the front subframe.

As shown in FIGS. 1 and 8, a pair of left and right front suspensions 30 is provided such that each front suspension 30 is connected to the front subframe 6 and the corresponding one of the left and right front side frames 4. Each front suspension 30 includes a lower arm 31 swingably supported by the corresponding front longitudinal member 23, a front knuckle 32 supported by the lower arm 31, and a front shock absorber 33 connecting an upper part of the front knuckle 32 and the upper wall 17B of the corresponding front damper housing 17.

Each lower arm 31 is a so-called A-arm and includes an arm rear part 31A extending from the rear end forward and laterally outward in an oblique manner, an arm curved part 31B that is curved laterally outward from the front end of the arm rear part 31A, and an arm front part 31C extending laterally outward from the laterally outer end of the arm curved part 31B and supporting the front knuckle 32 at the tip end thereof. The arm front part 31C is formed to have a width larger than those of the arm rear part 31A and the arm curved part 31B. On a laterally inner side of the arm curved part 31B, a front pivotal support portion 31D is provided to protrude laterally. The front pivotal support portion 31D has an axis that extends in the fore-and-aft direction. The rear end of the arm rear part 31A is provided with a rear pivotal support portion 31E having a vertically extending axis.

As shown in FIG. 4, each of the left and right front longitudinal members 23 is provided with a front lower arm support 36 that supports the front pivotal support portion 31D of the lower arm 31 and a rear lower arm support 51 that supports the rear pivotal support portion 31E of the lower arm 31.

Each front lower arm support 36 is disposed to be generally aligned with the front cross member 24 laterally, namely, each front lower arm support 36 is disposed at a position overlapping the front cross member 24 in side view and is joined to the corresponding front longitudinal member 23 and the front cross member 24.

As shown in FIG. 5, each front lower arm support 36 includes a base portion 36A extending laterally above the corresponding front longitudinal member 23 and joined to the front longitudinal member 23 and the front cross member 24, and front and rear support walls 36B, 36C each joined to the base portion 36A and the front longitudinal member 23 and protruding laterally outward from the laterally outer surface of the front longitudinal member 23.

The base portion 36A is formed in a hollow shape by combining a front member and a rear member and is joined to an upper surface and a laterally inner surface of the front longitudinal members 23 and an upper wall of the front cross member 24. The laterally inner end of the base portion 36A extends through the upper wall of the front cross member 24 formed in a hollow shape and extends to the interior of the front cross member 24. The base portion 36A extends from the upper surface of the front longitudinal member 23 upward and laterally outward and forms a laterally outer end portion. The laterally outer end portion of the base portion 36A is positioned more laterally outward than the laterally outer surface of the front longitudinal member 23.

The laterally outer end portion of the base portion 36A is joined to the lower surface of the front side frame front part 4A via a bracket 39. The bracket 39 includes an upper plate portion fastened to the lower surface of the front side frame front part 4A by a vertically extending bolt, and a vertical plate portion depending from a laterally inner end of the upper plate portion. The vertical plate portion of the bracket 39 contacts a laterally outward-facing end surface of the laterally outer end portion of the base portion 36A and is fastened to the laterally outer end portion of the base portion 36A by a laterally extending bolt.

An upper part of the base portion 36A forms a slanted portion 36D (connecting portion) that is slanted upwardly from a laterally inner end portion to a laterally outer end portion thereof. Namely, the slanted portion 36D extends in a slanted manner from the front cross member 24 to the front side frame front part 4A.

Each of the front and rear support walls 36B, 36C is a plate-like member having a surface facing in the fore-and-aft direction and has a laterally inner edge welded to the laterally outer side of the front longitudinal member 23. The rear support wall 36C is positioned behind the front support wall 36B via a gap. An upper part of the laterally inner edge of the front support wall 36B extends to above the front longitudinal member 23 and is welded to the front face of the base portion 36A. An upper part of the laterally inner edge of the rear support wall 36C extends to above the front longitudinal member 23 and is welded to the rear face of the base portion 36A. A lower part of the laterally inner edge of each of the front and rear support walls 36B, 36C extends to under the front longitudinal member 23 and is welded to the lower surface of the front longitudinal member 23.

As shown in FIG. 8, the front pivotal support portion 31D of the lower arm 31 is positioned between the front and rear support walls 36B, 36C. The front pivotal support portion 31D of the lower arm 31 is fitted with a rubber bushing (not shown in the drawings), and a support shaft (not shown in the drawings) is supported on the front and rear support walls 36B, 36C so as to extend in the fore-and-aft direction through the rubber bushing.

As described above, the front lower arm support 36 includes the base portion 36A and the front and rear support walls 36B, 36C and swingably supports the front pivotal support portion 31D of the lower arm 31. The front lower arm support 36 is welded to the front longitudinal member 23 and the front cross member 24 and is fastened to the front side frame front part 4A via the bracket 39.

As shown in FIG. 4, it is preferred that, in plan view, the front support wall 36B forming the front end of the front lower arm support 36 is positioned more forward than the rear end of the lateral end portion of the front cross member 24, and the rear support wall 36C forming the rear end of the front lower arm support 36 is positioned more rearward than the front end of the front cross member 24. In other words, preferably, the front lower arm support 36 overlaps the front cross member 24 in side view. In the present embodiment, the front support wall 36B (the front end of the front lower arm support 36) is positioned more rearward than the front end of the front cross member 24 and the rear support wall 36C (the rear end of the front lower arm support 36) is positioned more forward than the rear end of the front cross member 24.

As shown in FIG. 8, a steering gearbox 40 is provided on the upper surface of the front cross member 24. The steering gearbox 40 includes a laterally extending cylindrical rack housing 41. Inside the rack housing 41, a rack shaft 42 is provided to be laterally slidable relative to the rack housing 41. The left and right end portions of the rack shaft 42 laterally protrude from the rack housing 41 and are connected to the left and right front knuckles 32 via respective tie rods 43. The rack shaft 42 and each tie rod 43 are connected by a joint 44, which may be a ball joint, for example. The left and right joints 44 are arranged in respective boots 45 which are attached to the left and right ends of the rack housing 41, respectively.

At four positions of the front cross member 24; namely, in lateral end portions of the front part of the front cross member 24 and in portions of the rear part of the front cross member 24 located laterally inward of the laterally inner end portions of the base portions 36A of the left and right front lower arm supports 36, collars 47 are provided such that each collar 47 vertically extends through the front cross member 24 and is welded to the upper wall and the lower wall of the front cross member 24. The two collars 47 on the rear side are positioned more laterally inward than the two collars 47 on the front side.

The lateral end portions of the front part of the rack housing 41 are fastened to the front-side left and right collars 47 provided in the front cross member 24 by means of bolts. The rear part of the rack housing 41 is fastened to one of the rear-side left and right collars 47 provided in the front cross member 24 by means of a bolt. The shape of the rack housing 41 varies depending on the lateral position of the steering shaft, and one of the rear-side collars 47 to which the rack housing 41 is fastened is selected in accordance with the shape of the rack housing 41. Thus, the rack housing 41 is fastened to the front cross member 24 at three positions.

The front edge (front end) of each front lower arm support 36 is positioned more rearward than the front edge (front end) of the front cross member 24. The laterally inner end portion of the slanted portion 36D of each base portion 36A is positioned laterally outward of (to the side of) the upper end of the corresponding rear-side collar 47.

Each rear lower arm support 51 is provided in a part of the corresponding front longitudinal member 23 between the front lower arm support 36 and the rear end of the front longitudinal member 23 fastened to the lateral extension 4D. The rear lower arm support 51 has an opening 51A (see FIGS. 5 and 6) formed in a laterally outer face of the front longitudinal member 23 and a support shaft (not shown in the drawings) provided in a deeper side of the opening 51A and extending vertically to be joined to the upper and lower walls of the front longitudinal member 23. The rear pivotal support portion 31E of each lower arm 31 is fitted with a rubber bushing (not shown in the drawings) through which the support shaft is passed. The rear pivotal support portion 31E of the lower arm 31 is allowed to move relative to the rear lower arm support 51 by deformation of the rubber bushing. Thereby, each lower arm 31 is swingably supported to the front subframe 6 by the front lower arm support 36 and the rear lower arm support 51.

As shown in FIG. 4, in bottom view (or in plan view), the rear lower arm support 51 on the left side is positioned on an extension line obtained by extending the left rear end portion of the brace 26. Also, in plan view, the rear lower arm support 51 on the right side is positioned on an extension line obtained by extending the right rear end portion of the brace 26. The rear lower arm supports 51 are positioned more laterally inward than the respective front lower arm supports 36. Further, the rear lower arm supports 51 are also positioned more laterally inward than the left and right joints 44, respectively.

Each front lower arm support 36 is positioned more rearward than the steering gearbox 40. Each arm front part 31C may extend slightly obliquely rearward toward the laterally outward direction, and the joint 44 on the same lateral side may be provided such that the joint 44 is positioned on an extension line obtained by extrapolating the arm front part 31C in the lengthwise direction when the steering is neutral.

Figure 6:
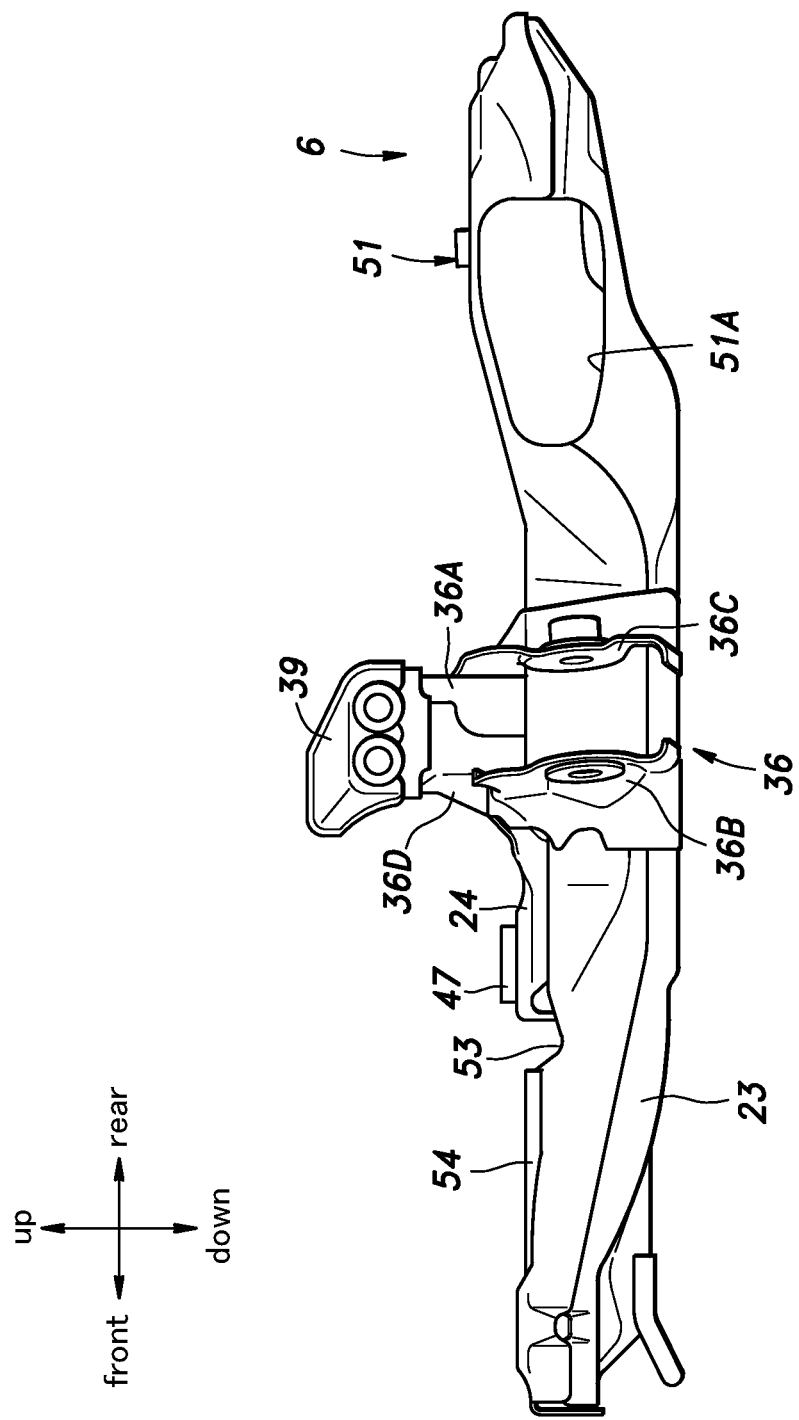
FIG. 6 is a left side view of the front subframe.

As shown in FIGS. 5 and 6, each front longitudinal member 23 is provided, in a part thereof forward of the joint with the front cross member 24, with a deformation promoting portion 53 which has a lower stiffness than the other part of the front longitudinal member 23. The deformation promoting portion 53 is a recess that is formed in the upper surface of the front longitudinal members 23 to be recessed downward. The deformation promoting portion 53 extends laterally from the laterally inner surface to the laterally outer face of the front longitudinal member 23. When a collision load is applied to the front longitudinal member 23 in the fore-and-aft direction, a deformation of the front longitudinal member 23 occurs first at the deformation promoting portion 53, and the front longitudinal member 23 is bent downward at the deformation promoting portion 53.

A reinforcing plate 54 extends along and is attached to a part of the upper surface of each front longitudinal member 23 located forward of the deformation promoting portion 53. A front stabilizer support 56 for rotatably supporting a front stabilizer 55 is provided on each reinforcing plate 54. The front stabilizer 55 is a rod member including a laterally extending portion and left and right end portions that extend rearward from the left and right ends of the laterally extending portion, respectively. The left and right end portions of the front stabilizer 55 are joined to the lower ends of the left and right front shock absorbers 33, respectively, via respective connecting members. Each front stabilizer support 56 is formed with a support hole (not shown in the drawings) through which the laterally extending portion of the front stabilizer 55 is passed. A rubber bushing for supporting the laterally extending portion of the front stabilizer 55 is fitted in the support hole of each front stabilizer support 56. Each front stabilizer support 56 is fastened to the upper surface of the corresponding front longitudinal member 23 by means of multiple bolts. A part of each front longitudinal member 23 on which the reinforcing plate 54 and the front stabilizer support 56 are provided is given a higher stiffness than the other part of the same.

As shown in FIGS. 1 and 2, the vehicle body structure 1 includes, as a rear structure, a pair of left and right rear side frames 71 respectively extending rearward from the rear ends of the left and right side sills 3 and a rear subframe 72 provided on the underside the rear side frames 71. The rear subframe 72 supports rear wheels 74 via rear suspensions 73 and also supports an electric motor 75 serving as a driving source for driving the rear wheels 74. In another embodiment, the driving source may be an internal combustion engine.

As shown in FIG. 2, each rear side frame 71 includes a rear side frame front part 71A (kick-up part) extending from the rear end of the corresponding side sill 3 upward and laterally inward toward the rear in an oblique manner and a rear side frame rear part 71C extending rearward from the rear end of the rear side frame front part 71A via a rear side frame bent part 71B. Each rear side frame 71 has a lower wall, an inner sidewall located on the laterally inner side, an outer sidewall located on the laterally outer side, and an upper wall, whereby the rear side frame 71 has a rectangular closed cross-section.

The left and right rear side frame front parts 71A are joined to each other by a vehicle body cross member 77 that extends laterally. The left and right end portions of the vehicle body cross member 77 are joined to laterally inner surfaces of front parts of the rear side frame front parts 71A, respectively. A rear floor panel 78 is provided on the upper side of the left and right rear side frames 71 and the vehicle body cross member 77. The vehicle body cross member 77 has a hat-shaped cross-section opening upward and forms a closed section structure in cooperation with the rear floor panel 78. A pair of left and right floor members 79A are joined to a laterally middle portion of the vehicle body cross member 77 so as to extend forward along the lower surface of the rear floor panel 78. The floor members 79 are formed to have a lower height than the vehicle body cross member 77.

Figure 9:
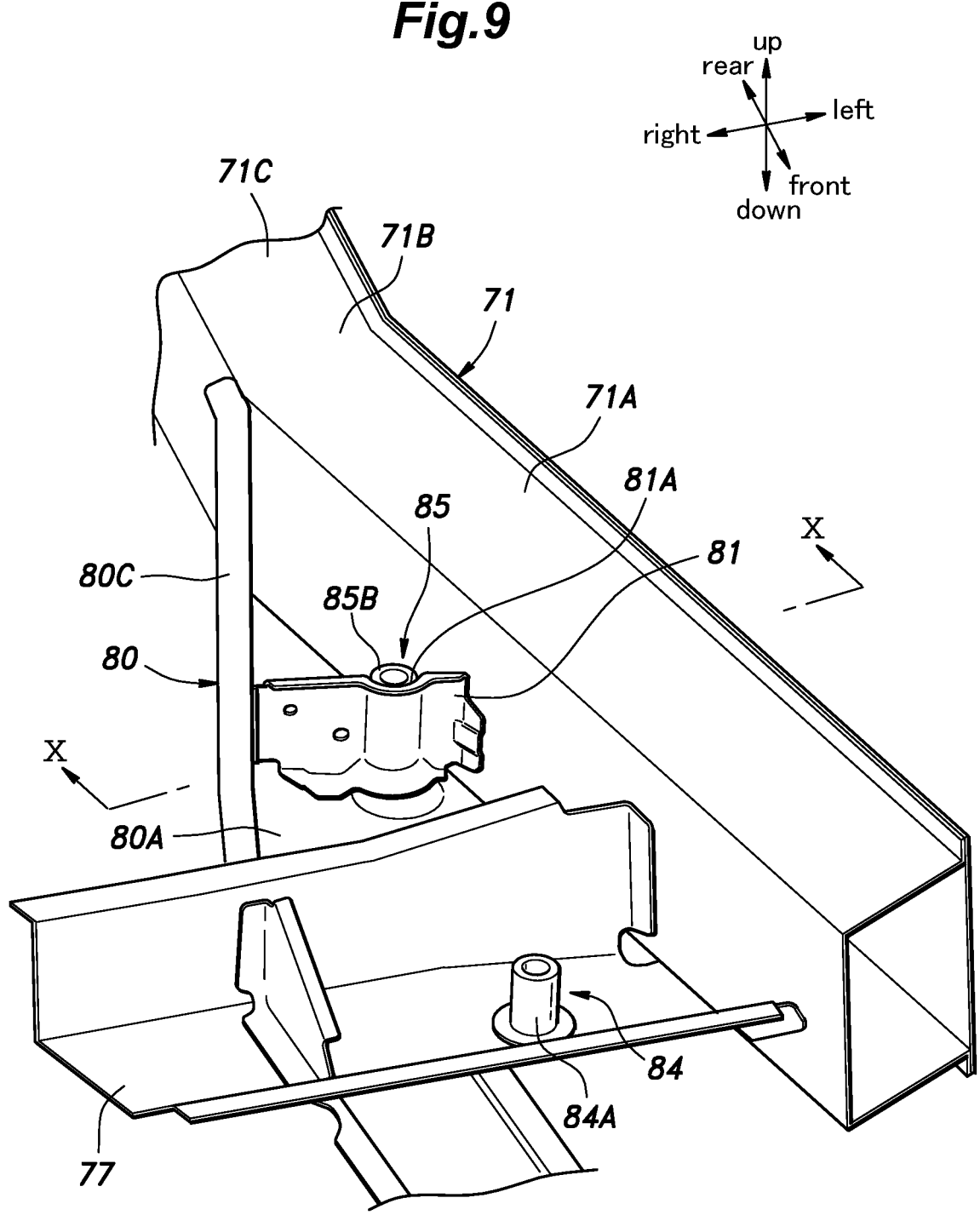
FIG. 9 is a perspective view showing a connecting structure between the rear side frame, the vehicle body cross member, and a load transmitting member, with a rear floor panel being omitted.
Figure 10:
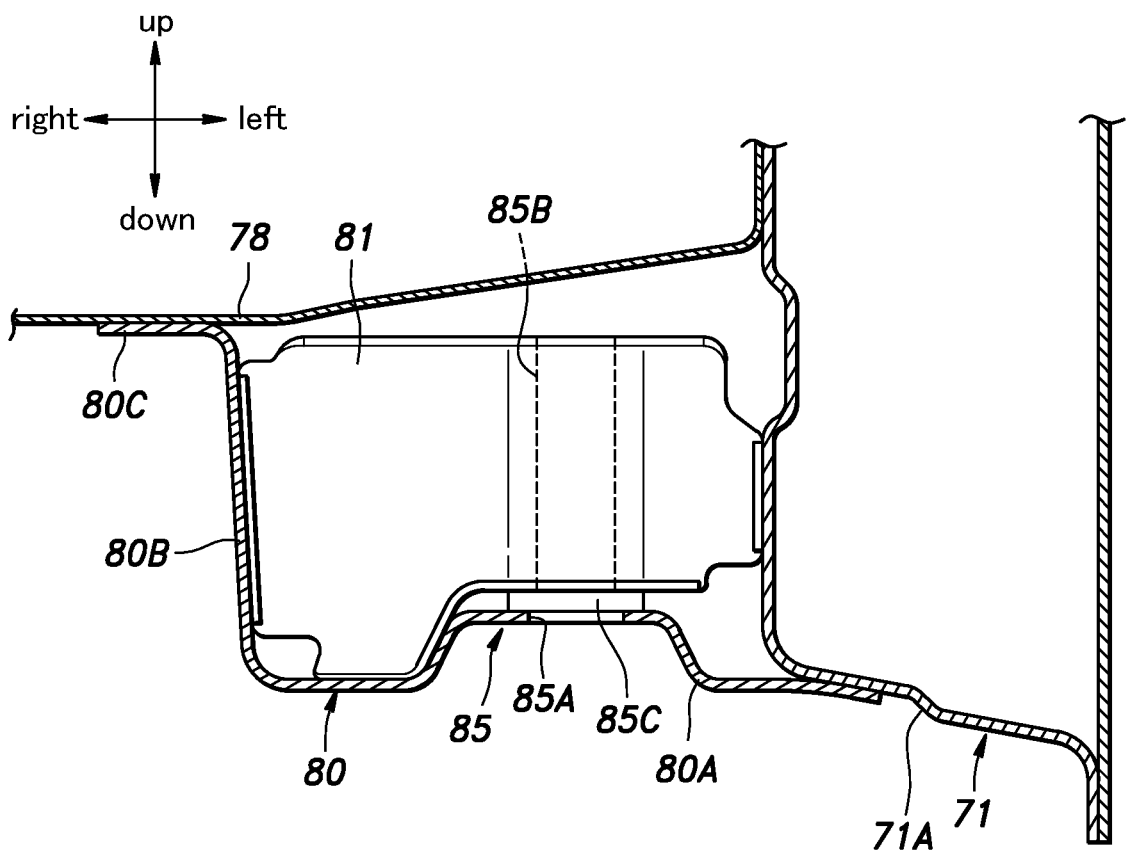
FIG. 10 is a sectional view showing the connecting structure between the rear side frame, the vehicle body cross member, and the load transmitting member.

As shown in FIGS. 2 and 9, a pair of left and right load transmitting members 80 are provided on the rear side of the vehicle body cross member 77 and on the laterally inner side of the left and right rear side frame front parts 71A, respectively. Each load transmitting member 80 is provided in the corner formed by the corresponding rear side frame front part 71A and the vehicle body cross member 77. As shown in FIGS. 9 and 10, each load transmitting member 80 includes a bottom wall 80A having a vertically facing surface, a vertical wall 80B extending upward from a laterally inner edge of the bottom wall 80A, and a flange 80C extending laterally inward from an upper edge of the vertical wall 80B.

The bottom wall 80A has a laterally extending front edge and inner and outer edges that extend obliquely rearward from lateral ends of the front edge, respectively, so as to approach each other toward the rear, whereby the bottom wall 80A is formed in a triangle. Namely, the bottom wall 80A of each load transmitting member 80 has a lateral width that increases gradually toward the front. More specifically, the bottom wall 80A is formed in an isosceles triangle, with the inner edge and the outer edge having a substantially same length. The front edge of the bottom wall 80A extends along the lower surface of the vehicle body cross member 77 and is welded to the lower surface of the vehicle body cross member 77 at multiple positions. The outer edge of the bottom wall 80A extends along the lower surface of the lower wall of the rear side frame front part 71A and is welded to the lower wall of the rear side frame front part 71A at multiple positions. The flange 80C is welded to the lower surface of the rear floor panel 78 at multiple positions. The vertical wall 80B and the flange 80C extend from the rear end of the rear side frame front part 71A forward and laterally inward to the rear face of the vehicle body cross member 77. Each load transmitting member 80 forms a closed section structure in cooperation with the rear side frame front part 71A, the vehicle body cross member 77, and the rear floor panel 78.

In the closed section structure formed by the load transmitting member 80, the rear side frame front part 71A, the vehicle body cross member 77, and the rear floor panel 78, at least one partition wall 81 is provided. In the illustrated embodiment, a single partition wall 81 is provided. The partition wall 81 has a surface facing in the fore-and-aft direction, extends laterally, and has a laterally inner end welded to the vertical wall 80B of the load transmitting member 80 and a laterally outer end welded to the inner sidewall of the rear side frame front part 71A. Further, the partition wall 81 has a lower end welded to the bottom wall 80A of the load transmitting member 80. The laterally inner end, the laterally outer end, and the lower end of the partition wall 81 are preferably bent to form flanges. In another embodiment, the upper end of the partition wall 81 may be welded to the lower surface of the rear floor panel 78.

As shown in FIG. 2, the rear part of the vehicle body structure 1 is provided, on each lateral side thereof, with first to fourth vehicle body-side attachment portions 83 to 86 for attachment of the rear subframe 72. Each of the left and right first vehicle body-side attachment portions 83 is provided in a front end portion of the corresponding rear side frame front part 71A. Each first vehicle body-side attachment portion 83 is constituted of a through-hole formed in the lower wall of the rear side frame front part 71A and a collar (not shown in the drawings) provided on the upper surface side of the lower wall of the rear side frame front part 71A so as to oppose the through-hole. The collar extends vertically inside the rear side frame front part 71A and is welded to the lower wall of the rear side frame front part 71A. Preferably, the collar may also be welded to a partition wall (not shown in the drawings) provided inside the rear side frame front part 71A. The collar is formed with a female thread in an inner periphery thereof.

Figure 13:
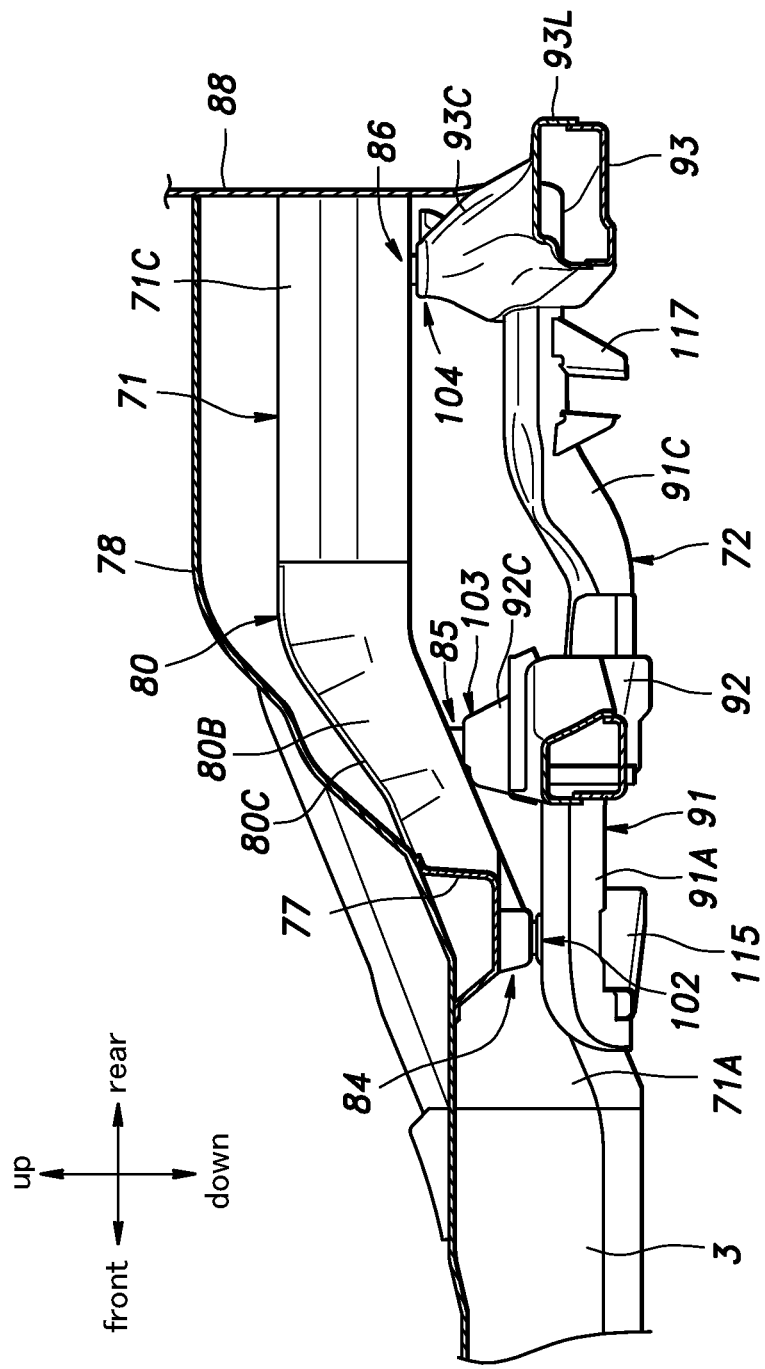
FIG. 13 is a sectional view taken along line XIII-XIII in FIG. 12.

As shown in FIGS. 2, 9, and 13, the left and right second vehicle body-side attachment portions 84 are respectively provided on the left and right end portions of the vehicle body cross member 77. The second vehicle body-side attachment portions 84 are positioned more laterally inward than the first vehicle body-side attachment portions 83. Each second vehicle body-side attachment portion 84 is constituted of a through-hole formed in the lower wall of the vehicle body cross member 77 and a collar 84A provided on the upper surface side of the lower wall of the vehicle body cross member 77 so as to oppose the through-hole. The collar 84A extends vertically inside the vehicle body cross member 77 and is welded to the lower wall of the vehicle body cross member 77. Preferably, the collar 84A may also be welded to a partition wall (not shown in the drawings) provided inside the vehicle body cross member 77. The collar 84A is formed with a female thread in an inner periphery thereof.

As shown in FIGS. 9 and 10, each of the left and right third vehicle body-side attachment portions 85 is provided on the corresponding load transmitting member 80. The left and right third vehicle body-side attachment portions 85 are arranged at substantially the same lateral positions as the left and right second vehicle body-side attachment portions 84, respectively. Each third vehicle body-side attachment portion 85 is constituted of a through-hole 85A extending vertically through the bottom wall 80A of the corresponding load transmitting member 80 and a collar 85B provided on the upper surface of the bottom wall 80A so as to oppose the through-hole 85A. The collar 85B extends vertically, has a lower end welded to the upper surface of the bottom wall 80A, and has a side surface welded to the partition wall 81. The partition wall 81 is formed with a recess 81A for receiving a side part of the collar 85B. Further, the collar 85B has a flange 85C in the lower end thereof and is in contact with the bottom wall 80A at the flange 85C. The collar 85B is formed with a female thread in an inner periphery thereof.

Figure 17:
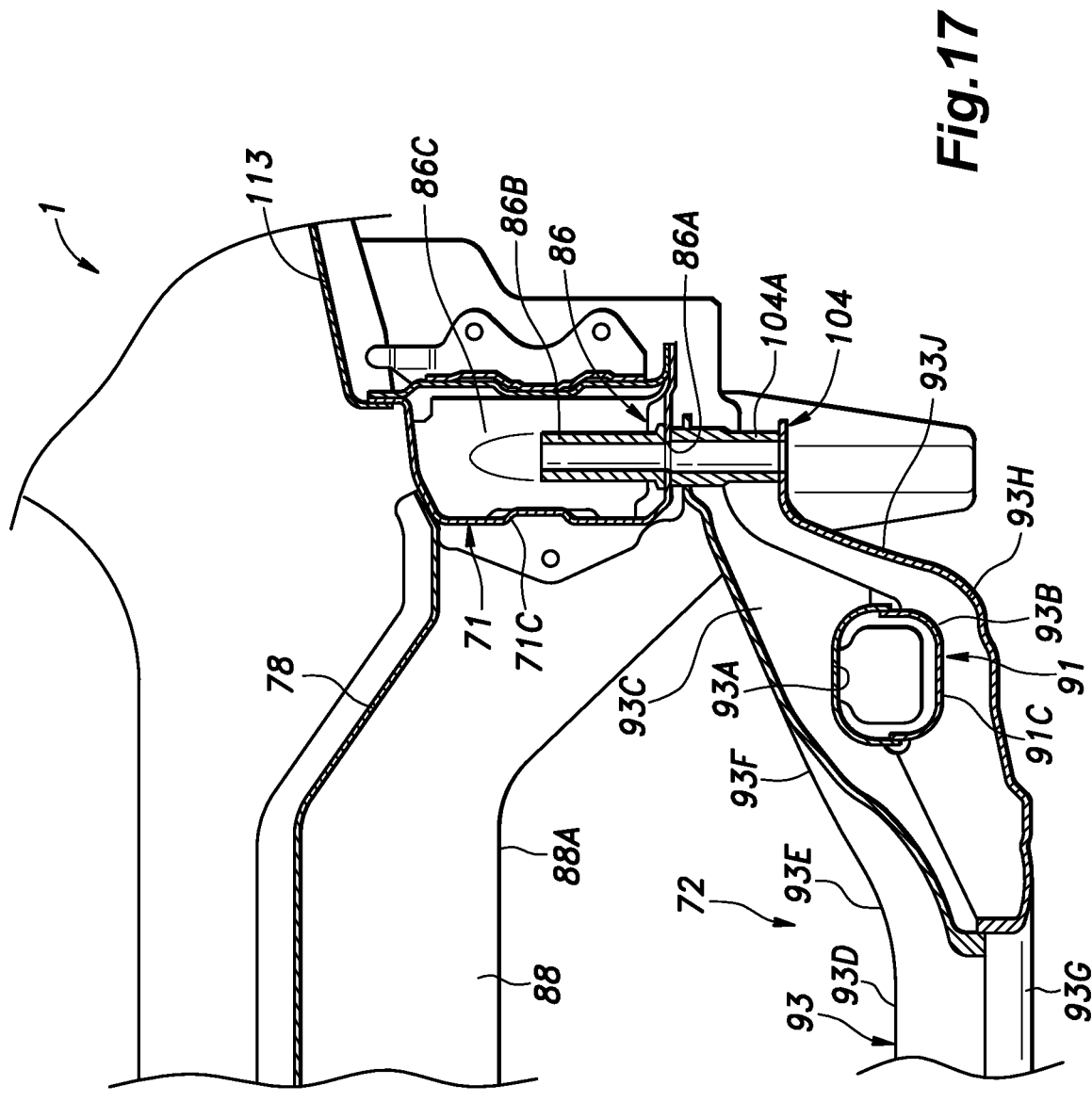
FIG. 17 is a sectional view taken along line XVII-XVII in FIG. 12.

As shown in FIGS. 2 and 17, each of the left and right fourth vehicle body-side attachment portions 86 is provided in the rear end of the corresponding rear side frame rear part 71C. Each fourth vehicle body-side attachment portion 86 is constituted of a through-hole 86A formed in the lower wall of the corresponding rear side frame rear part 71C and a collar 86B provided on the upper surface side of the lower wall of the rear side frame rear part 71C so as to oppose the through-hole 86A. The collar 86B extends vertically inside the rear side frame rear part 71C and is welded to the lower wall of the rear side frame rear part 71C. Further, the collar 86B is welded to a partition wall 86C provided inside the rear side frame rear part 71C. The collar 86B is formed with a female thread in an inner periphery thereof.

Figure 18:
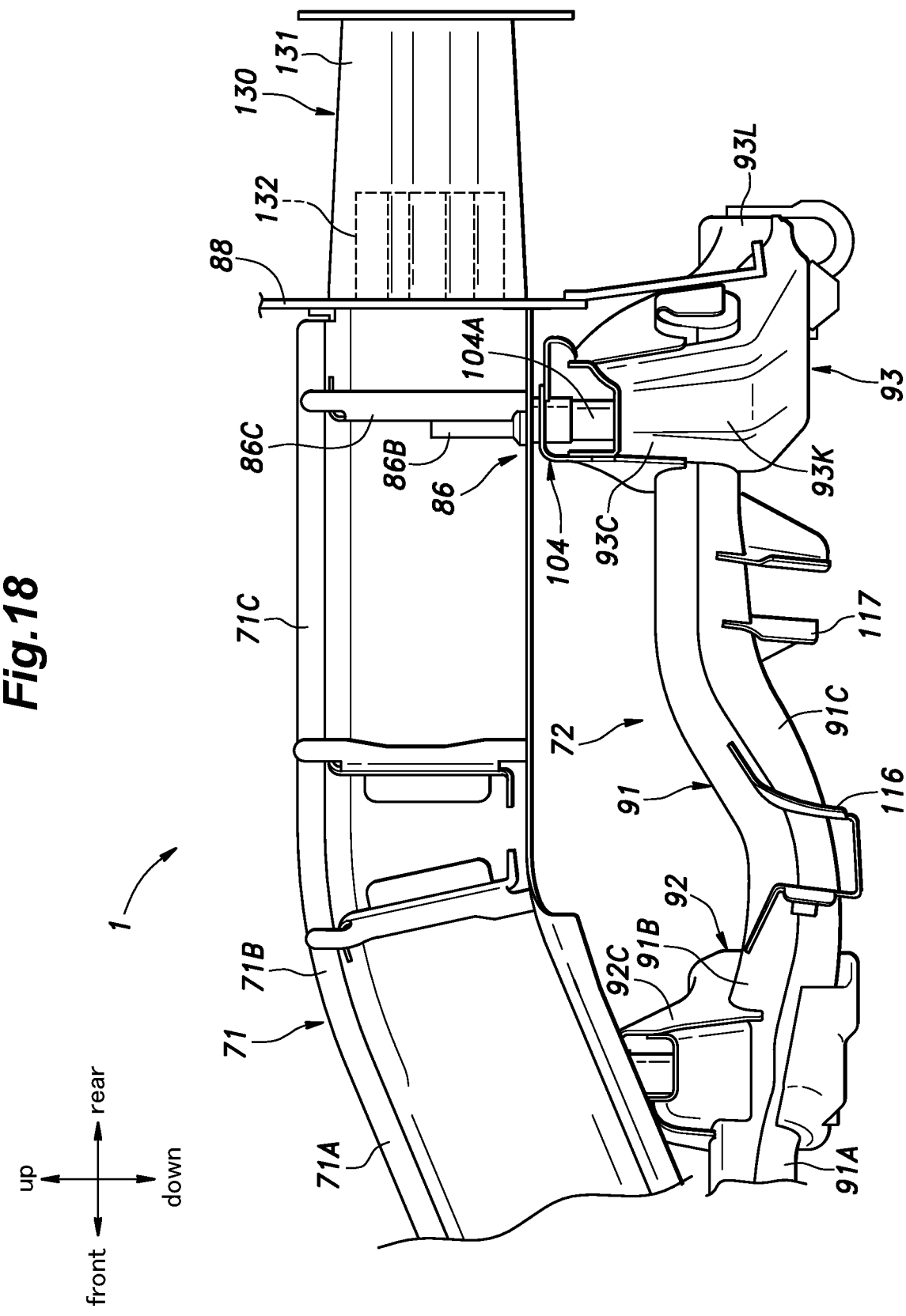
FIG. 18 is a left side view of a rear part of the vehicle body structure (with a left sidewall of the rear side frame being omitted)

As shown in FIGS. 17 and 18, the rear ends of the left and right rear side frame rear parts 71C are joined to a rear panel 88 that extends laterally to have a surface facing in the fore-and-aft direction. The rear panel 88 is joined to the rear edge of the rear floor panel 78.

The rear subframe 72 includes a pair of left and right rear longitudinal members 91 extending in the fore-and-aft direction, and a first rear cross member 92 and a second rear cross member 93 each extending laterally and joined to the rear longitudinal members 91. The first rear cross member 92 is positioned forward of the second rear cross member 93.

Figure 11:
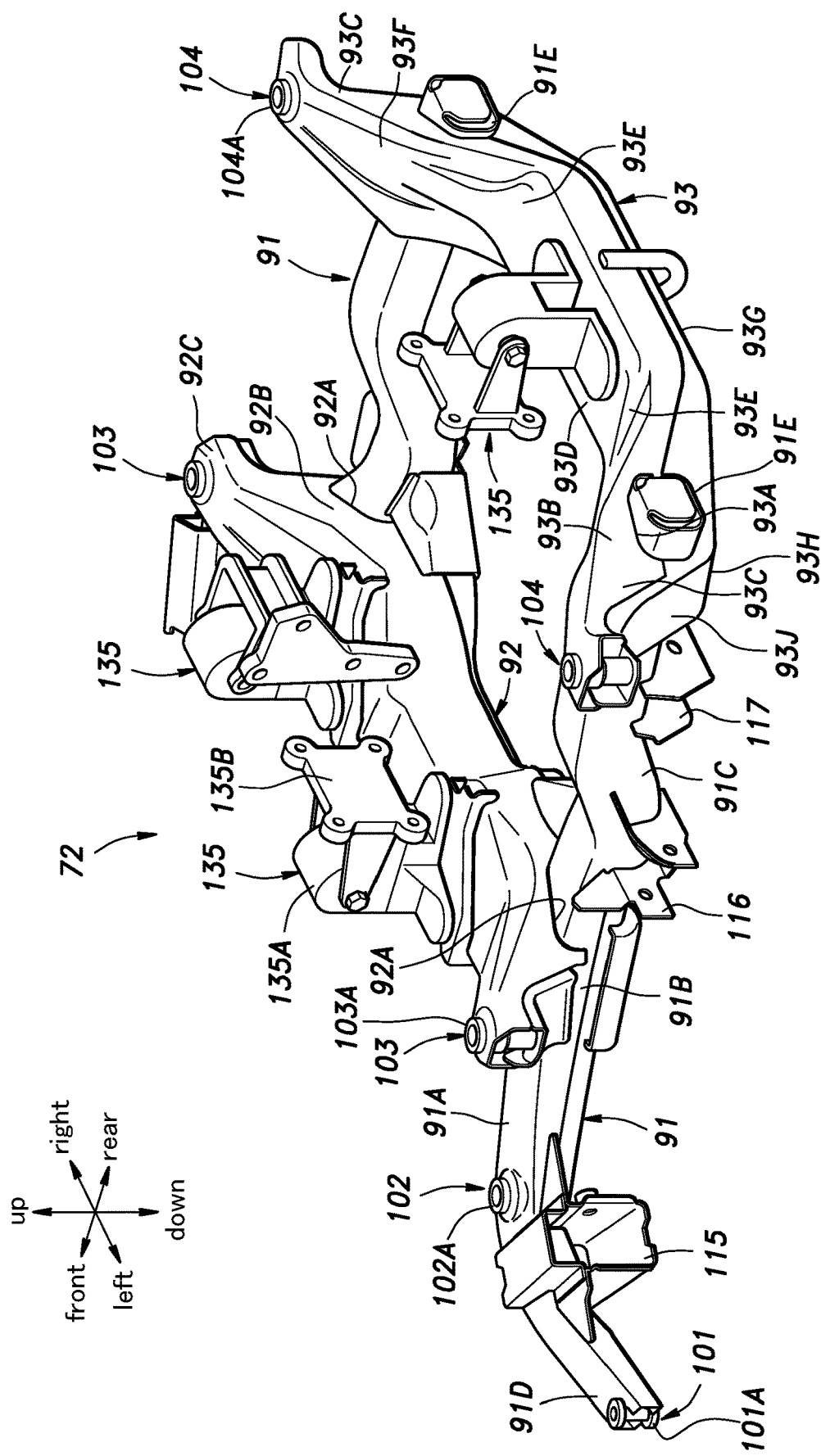
FIG. 11 is a perspective view of the rear subframe.
Figure 15:
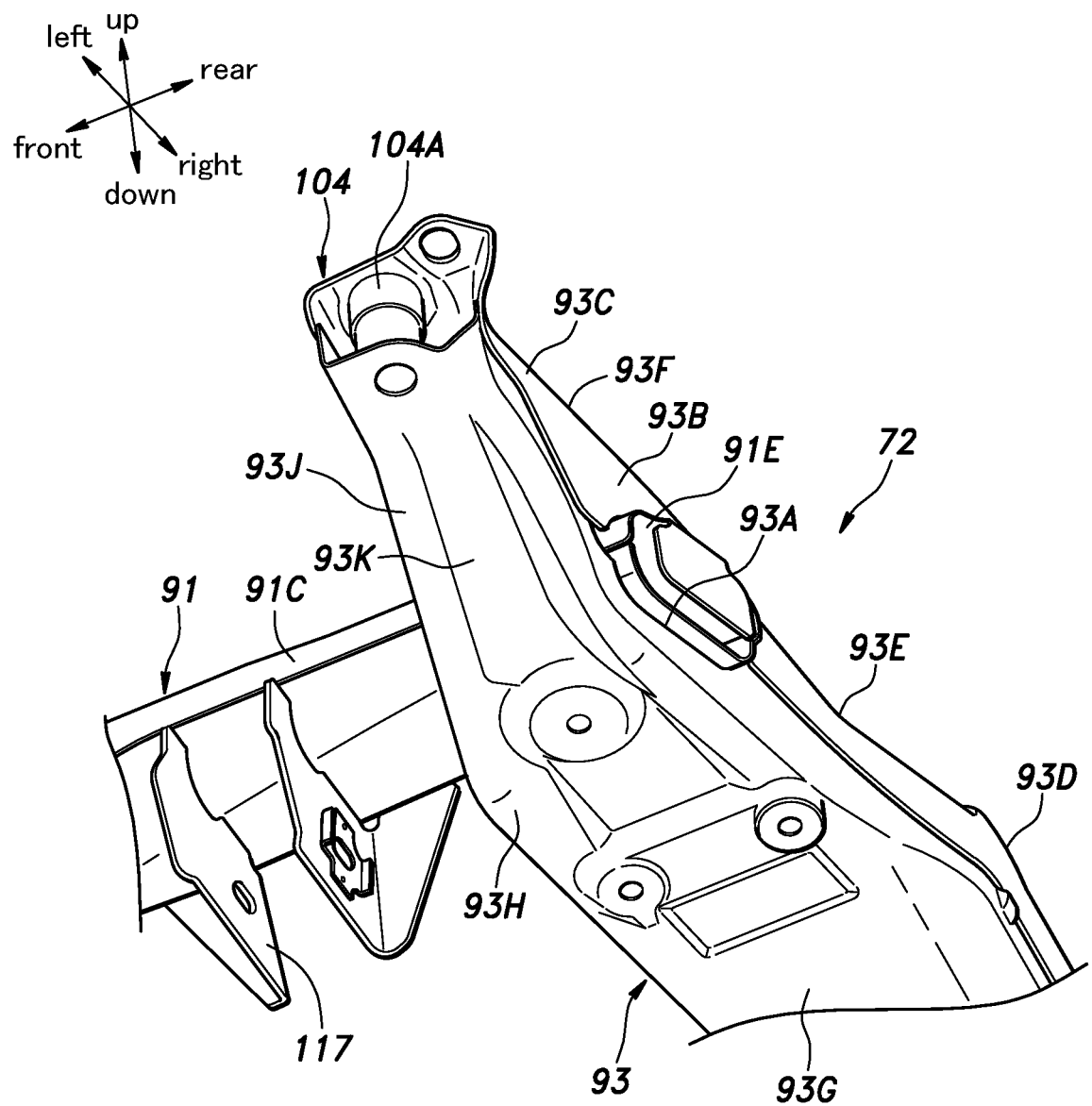
FIG. 15 is a perspective view showing the left rear end of the rear subframe as seen from below.
Figure 16:
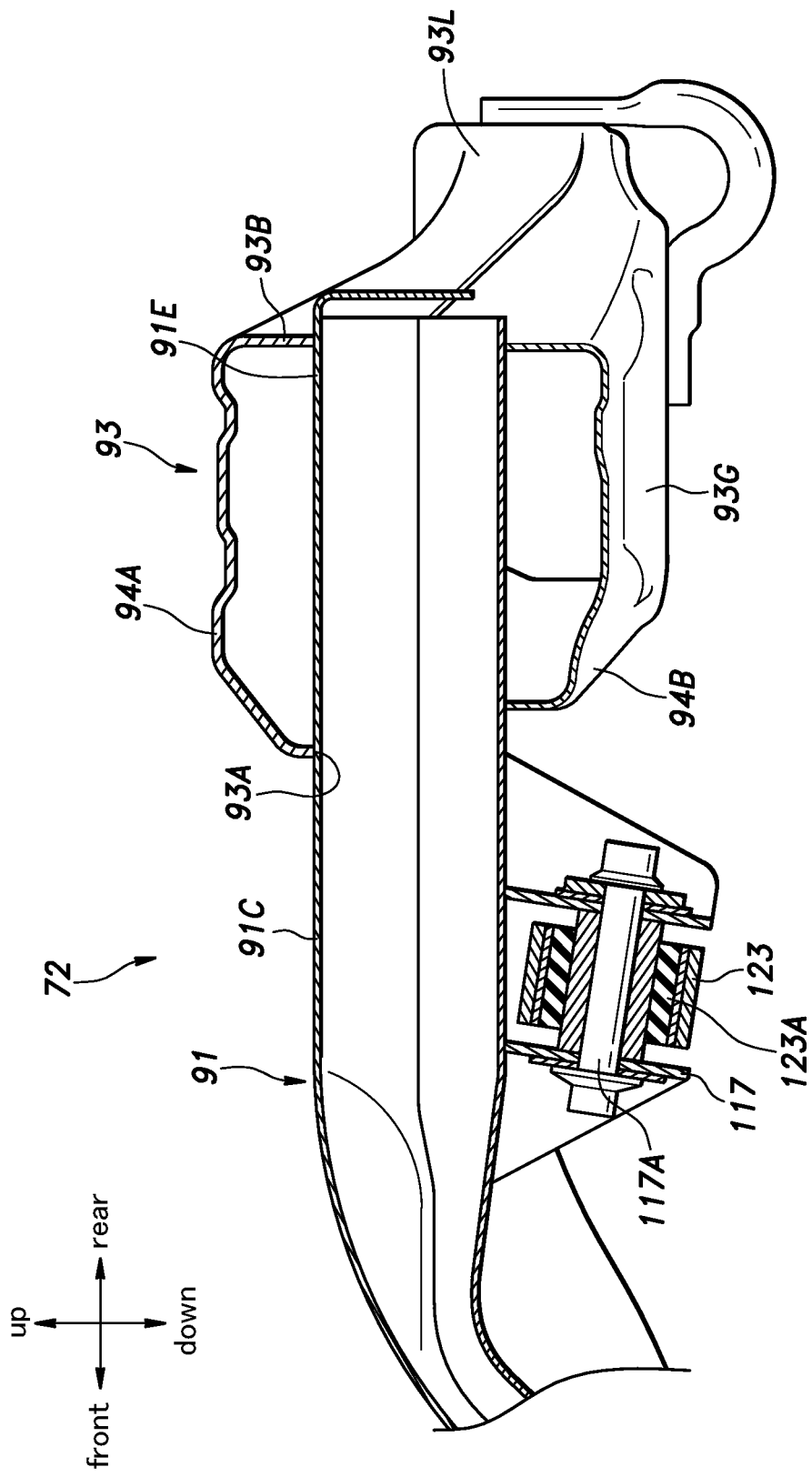
FIG. 16 is a sectional view taken along line XVI-XVI in FIG. 12.

Each of the left and right rear longitudinal members 91, the first rear cross member 92, and the second rear cross member 93 is formed by combining an upper member (e.g., an upper member 94A constituting the second rear cross member 93) having a channel-shaped cross-section that opens downward and a lower member (e.g., a lower member 94B constituting the second rear cross member 93) having a channel-shaped cross-section that opens upward, and has a hollow structure (see FIG. 16). Preferably, the upper member and the lower member include sidewalls having free ends overlapping each other, and are welded to each other at the overlapping free ends (see FIG. 15). As shown in FIG. 11, the first rear cross member 92 has a pair of left and right first longitudinal member insertion holes 92A extending therethrough in the fore-and-aft direction. The second rear cross member 93 has a pair of left and right second longitudinal member insertion holes 93A extending therethrough in the fore-and-aft direction. Each of the left and right rear longitudinal members 91 extends in the fore-and-aft direction to pass through the corresponding first longitudinal member insertion hole 92A and the corresponding second longitudinal member insertion holes 93A and is welded to the first rear cross member 92 and the second rear cross member 93 in the first longitudinal member insertion hole 92A and the second longitudinal member insertion hole 93A. The parts of the first rear cross member 92 joined to the left and right rear longitudinal members 91, namely, the parts around the first longitudinal member insertion holes 92A are referred to as first longitudinal member joint portions 92B. Also, the parts of the second rear cross member 93 joined to the left and right rear longitudinal members 91, namely, the parts around the second longitudinal member insertion holes 93A are referred to as second longitudinal member joint portions 93B.

Figure 12:
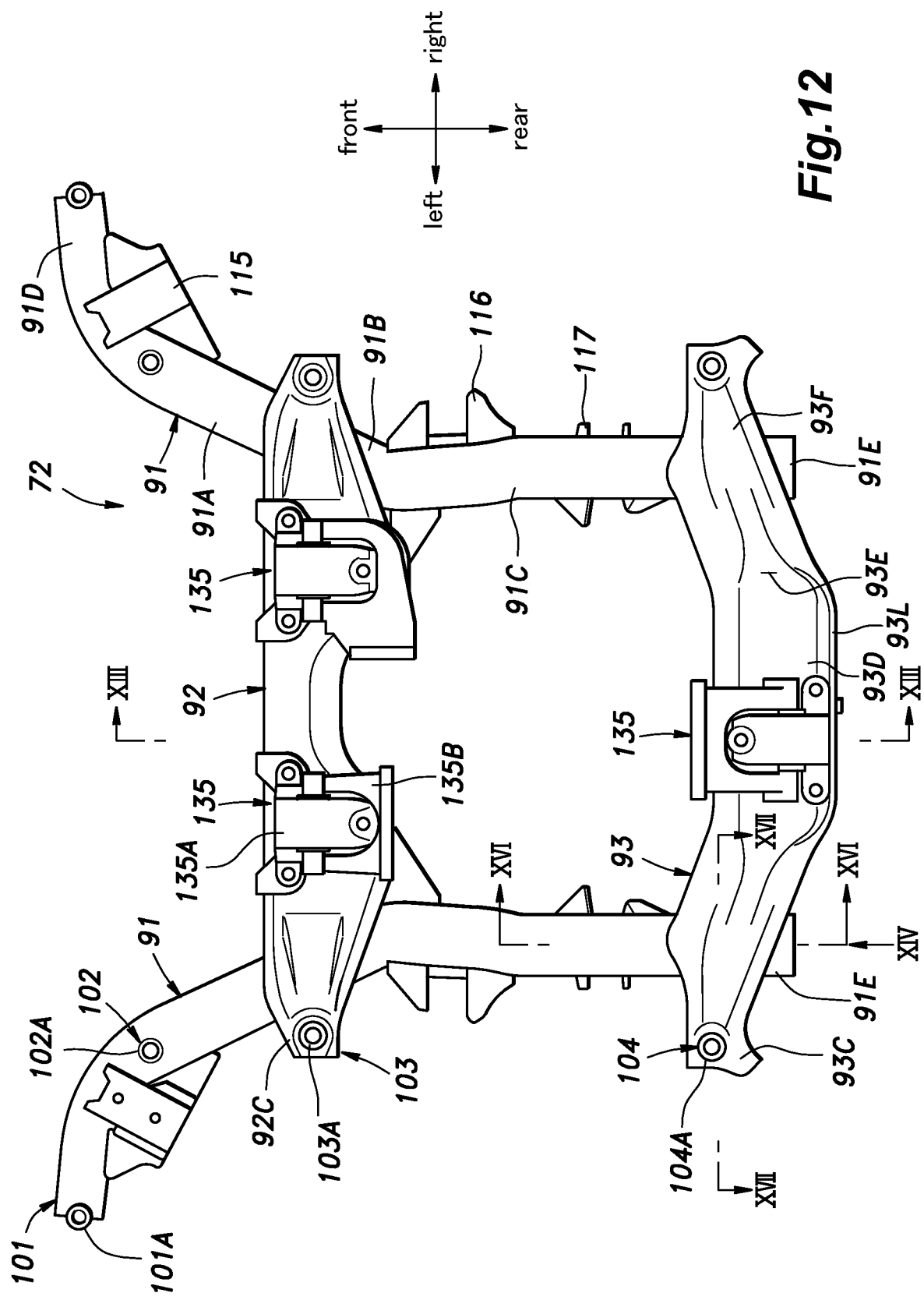
FIG. 12 is a plan view of the rear subframe.

As shown in FIGS. 11 and 12, each rear longitudinal member 91 includes a rear longitudinal member front part 91A extending rearward and laterally inward in an oblique manner and a rear longitudinal member rear part 91C extending rearward from the rear end of the rear longitudinal member front part 91A via a rear longitudinal member bent part 91B. The rear longitudinal member bent part 91B of each rear longitudinal member 91 is joined to the corresponding first longitudinal member joint portion 92B of the first rear cross member 92. The rear longitudinal member rear part 91C extends from the first longitudinal member joint portion 92B of the first rear cross member 92 to the second longitudinal member joint portion 93B of the second rear cross member 93. At the front end of each rear longitudinal member front part 91A, a rear longitudinal member front end part 91D is provided which extends laterally outward.

A first rear subframe-side attachment portion 101 is formed in the laterally outer end of each rear longitudinal member front end part 91D. The first rear subframe-side attachment portion 101 includes a collar 101A extending vertically through the rear longitudinal member front end part 91D. The collar 101A is welded to the upper and lower walls of the rear longitudinal member front end part 91D. Each first rear subframe-side attachment portion 101 is disposed on the underside of the corresponding first vehicle body-side attachment portion 83 and is fastened to the first vehicle body-side attachment portion 83 by a bolt.

Each rear longitudinal member front part 91A is formed with a second rear subframe-side attachment portion 102. The second rear subframe-side attachment portion 102 includes a collar 102A extending vertically through the rear longitudinal member front part 91A. The collar 102A is welded to the upper and lower walls of the rear longitudinal member front part 91A. Each second rear subframe-side attachment portion 102 is disposed on the underside of the corresponding second vehicle body-side attachment portion 84 and is fastened to the second vehicle body-side attachment portion 84 by a bolt.

Each of the left and right end portions of the first rear cross member 92 is provided with a first extension 92C that extends laterally outward and upward from the corresponding first longitudinal member joint portion 92B (the corresponding rear longitudinal member 91). Each first extension 92C has a tip end (laterally outer end) formed with a third rear subframe-side attachment portion 103. The third rear subframe-side attachment portion 103 includes a collar 103A extending vertically through the tip end of the first extension 92C. The collar 103A is welded to the upper and lower walls of the first extension 92C. Each third rear subframe-side attachment portion 103 is disposed on the underside of the corresponding third vehicle body-side attachment portion 85 and is fastened to the third vehicle body-side attachment portion 85 by a bolt.

Each of the left and right end portions of the second rear cross member 93 is provided with a second extension 93C that extends laterally outward and upward from the corresponding second longitudinal member joint portion 93B (the corresponding rear longitudinal member 91). Each second extension 93C has a tip end (laterally outer end) formed with a fourth rear subframe-side attachment portion 104. The fourth rear subframe-side attachment portion 104 includes a collar 104A extending vertically through the tip end of the second extension 93C. The collar 104A is welded to the upper and lower walls of the second extension 93C. Each fourth rear subframe-side attachment portion 104 is disposed on the underside of the corresponding fourth vehicle body-side attachment portion 86 and is fastened to the fourth vehicle body-side attachment portions 86 by a bolt. Each of the rear longitudinal members 91 is provided, in the rear end portion thereof, with a rear-end attachment portion 91E attached to the corresponding rear side frame 71. The rear-end attachment portion 91E is attached to the rear side frame rear part 71C indirectly via the second extension 93C of the second rear cross member 93. In another embodiment, the rear-end attachment portion 91E may be attached to the rear side frame rear part 71C directly.

Each of the first extensions 92C and the second extensions 93C has a vertical width that decreases gradually toward the laterally outward direction. Namely, each of the first extensions 92C and the second extensions 93C becomes thinner toward the tip end.

Figure 14:
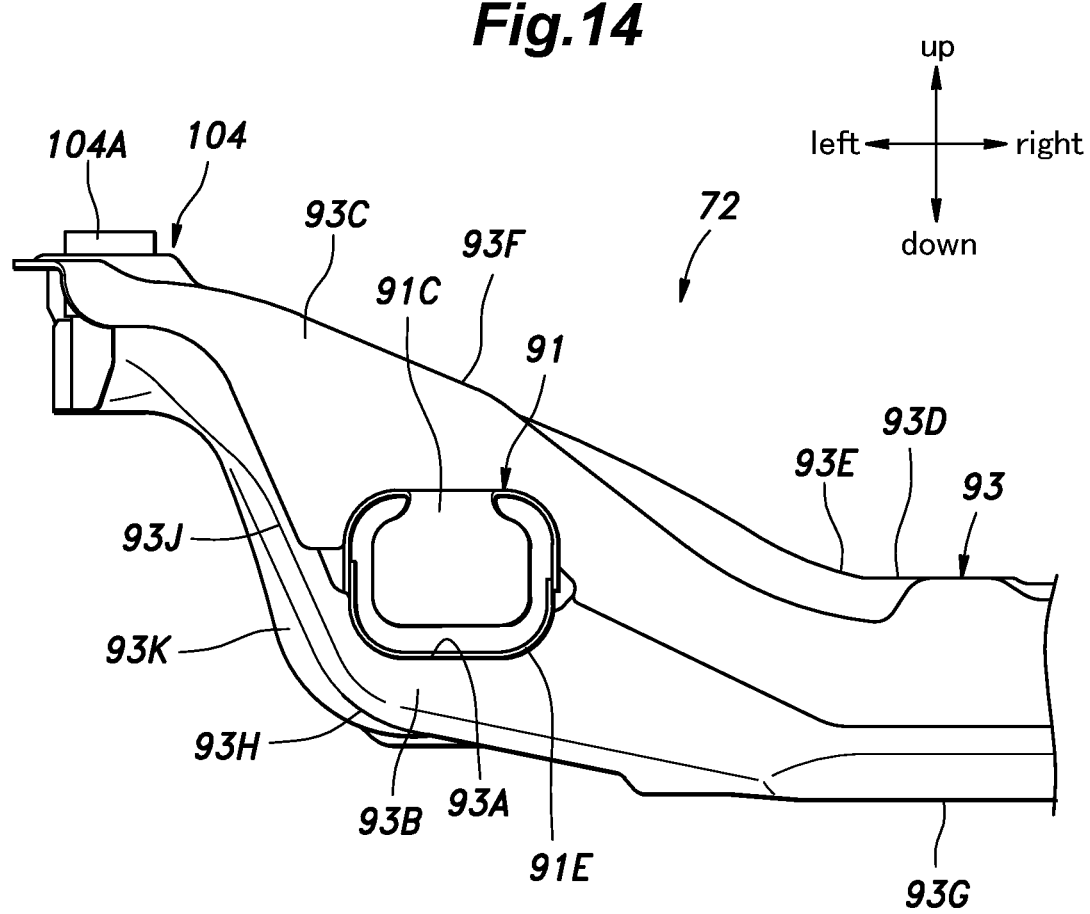
FIG. 14 is a rear view showing a left rear end of the rear subframe (a view as seen along arrow XIV in FIG. 12)

As shown in FIGS. 14 and 15, the second rear cross member 93 includes an upper surface central part 93D having an upward-facing surface and extending laterally, a pair of left and right upper surface slanted parts 93F extending laterally outward and upward from the left and right ends of the upper surface central part 93D, respectively, via upper surface bent parts 93E, a lower surface central part 93G having a downward-facing surface and extending laterally, and a pair of left and right lower surface slanted parts 93J extending laterally outward and upward from the left and right ends of the lower surface central part 93G, respectively, via lower surface bent parts 93H. The laterally outer ends of the upper surface slanted parts 93F and the lower surface slanted parts 93J reach the associated fourth rear subframe-side attachment portions 104. The upper surface central part 93D, the upper surface bent parts 93E, and the upper surface slanted parts 93F are formed in an upper member 94A constituting the second rear cross member 93, while the lower surface central part 93G, the lower surface bent parts 93H, and the lower surface slanted parts 93J are formed in a lower member 94B constituting the second rear cross member 93.

The left and right upper surface bent parts 93E are positioned laterally inward of the left and right second longitudinal member joint portions 93B, and the left and right lower surface bent parts 93H are positioned laterally outward of the left and right second longitudinal member joint portions 93B. Thereby, the second rear cross member 93 has the largest vertical width at each of the second longitudinal member joint portions 93B. The angle of each upper surface bent part 93E relative to the horizontal plane is smaller than the angle of each lower surface bent part 93H relative to the horizontal plane. Each of the lower surface slanted parts 93J includes a reinforcing bead 93K extending from the corresponding lower surface bent part 93H toward the corresponding fourth rear subframe-side attachment portion 104.

As shown in FIG. 1, the rear longitudinal members 91 are positioned laterally inward of and below the respective rear side frames 71. In plan view, each rear longitudinal member front part 91A and the corresponding rear side frame front part 71A are arranged in parallel to each other, and each rear longitudinal member rear part 91C and the corresponding rear side frame rear part 71C are arranged in parallel to each other. The rear side frame bent parts 71B are arranged at substantially the same fore-and-aft positions as the rear longitudinal member bent parts 91B.

Each of the rear side frames 71 is provided with a rear damper mount 112 for supporting an upper end of a corresponding rear shock absorber 111. The rear damper mount 112 may constitute a part of a side panel 113 forming a rear sidewall of the vehicle 2. Each rear side frame bent part 71B and each rear longitudinal member bent part 91B are arranged at positions overlapping (or generally aligned with) the corresponding rear damper mount 112 in the lateral direction. In other words, the rear side frame bent part 71B and the rear longitudinal member bent part 91B are positioned rearward of the front end of the rear damper mount 112 and forward of the rear end of the rear damper mount 112.

Each of the left and right rear longitudinal members 91 is provided with, from the front side, a first suspension arm support 115, a second suspension arm support 116, and a third suspension arm support 117. The first suspension arm support 115 is provided at the boundary between the rear longitudinal member front end part 91D and the rear longitudinal member front part 91A, the second suspension arm support 116 and the third suspension arm support 117 are provided on the rear longitudinal member rear part 91C. The first to third suspension arm supports 115-117 rotatably support inner ends of first to third suspension arms 121-123, respectively, via rubber bushings. Taking the third suspension arm 123 as an example, as shown in FIG. 16, a rubber bushing 123A is provided in the inner end of the third suspension arm 123, and the rubber bushing 123A is supported by a support shaft 117A provided in the third suspension arm support 117. A rear knuckle 124 for rotatably supporting the corresponding rear wheel 74 is supported at the outer ends of the first to third suspension arms 121-123. An upper part of the rear knuckle 124 is connected to the rear damper mount 112 via the rear shock absorber 111.

As shown in FIG. 1, the lower parts of the left and right rear shock absorbers 111 are connected to each other by a rear stabilizer 126. The rear stabilizer 126 is a rod member and includes a laterally extending portion and left and right end portions that extend rearward from the left and right ends of the laterally extending portion, respectively. The left and right end portions of the rear stabilizer 126 are joined to the lower ends of the left and right rear shock absorbers 111 via connecting members, respectively. The lower surfaces of the left and right rear longitudinal member front parts 91A are each provided with s rear stabilizer support 127 for rotatably supporting the laterally extending portion of the rear stabilizer 126.

Figure 19:
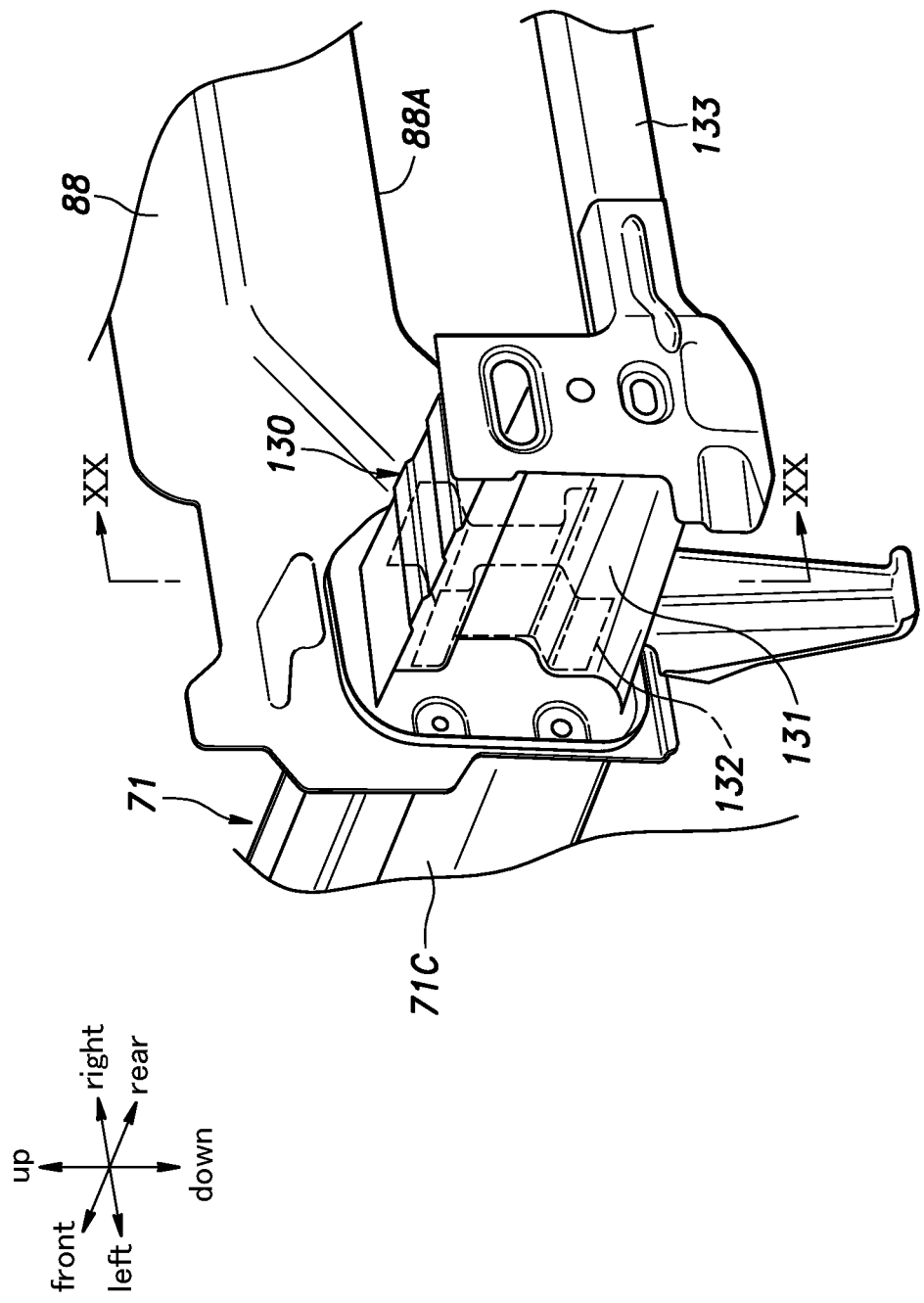
FIG. 19 is a perspective view showing a left end of the rear part of the vehicle body structure.

As shown in FIGS. 18 and 19, a pair of left and right shock-absorbing structures 130 that extend rearward are provided at the rear ends of the left and right rear side frames 71, respectively, via the rear panel 88. Each shock-absorbing structure 130 includes a first shock-absorbing member 131 and a second shock-absorbing member 132 each extending rearward from the rear face of the rear panel 88. The second shock-absorbing member 132 has higher fore-and-aft strength (stiffness) than the first shock-absorbing member 131. The second shock-absorbing member 132 has a shorter fore-and-aft dimension than the first shock-absorbing member 131, and the rear end of the second shock-absorbing member 132 is positioned forward of the rear end of the first shock-absorbing member 131.

Figure 20:
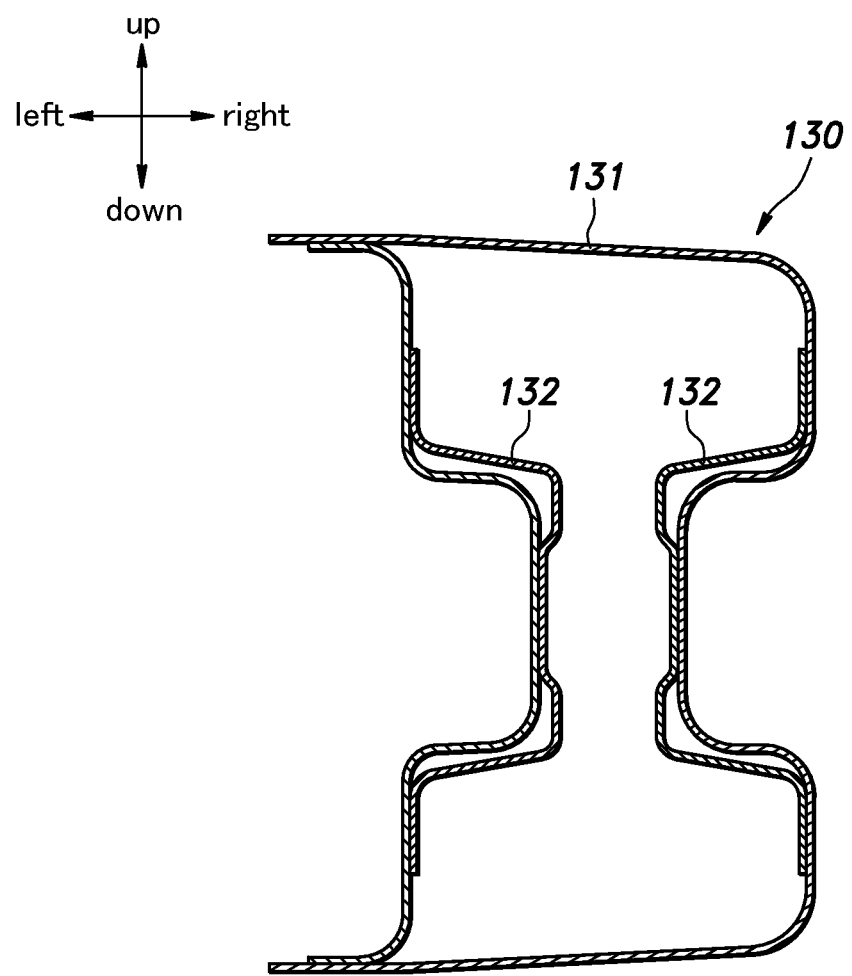
FIG. 20 is a cross-sectional view of a shock-absorbing structure co.

As shown in FIGS. 19 and 20, the first shock-absorbing member 131 is a crash box constituted of two steel sheets formed in a tubular shape having an axis extending in the fore-and-aft direction. The first shock-absorbing member 131 is formed such that the lateral width at a vertically middle part thereof is smaller than each of the lateral width at an upper part thereof and the lateral width at a lower part thereof. Preferably, the first shock-absorbing member 131 is formed with multiple grooves and ridges extending laterally or vertically. The rear ends of the left and right first shock-absorbing members 131 are joined to a rear bumper beam 133 that extends laterally.

Each second shock-absorbing member 132 is positioned inside the corresponding first shock-absorbing member 131 formed in a tubular shape. In the present embodiment, each second shock-absorbing member 132 is constituted of two steel sheets welded to the inner surfaces of left and right parts of the corresponding first shock-absorbing member 131. The two sheets constituting each second shock-absorbing member 132 are each bent to have recesses and ridges to define closed section structures in cooperation with the associated first shock-absorbing member 131. Preferably, the second shock-absorbing members 132 are made of a material having a higher strength (stiffness) than the first shock-absorbing members 131.

As shown in FIGS. 12 and 18, the second rear cross member 93 includes a protrusion 93L that protrudes rearward in a laterally central part thereof. A central part of the lower edge of the rear panel 88 is formed with a cutout (notch) 88A that is recessed upward (see FIGS. 17 and 19), and the protrusion 93L protrudes through the cutout 88A to the rear of the rear panel 88. The rear end of the protrusion 93L is positioned more rearward than the rear ends of the rear side frames 71 and the rear panel 88 and more forward than the rear ends of the shock-absorbing structures 130. More specifically, the rear end of the protrusion 93L is positioned more rearward than the rear ends of the second shock-absorbing members 132 and more forward than the rear ends of the first shock-absorbing members 131. The rear edge of the second rear cross member 93 extends from the protrusion 93L forward and laterally outward in an oblique manner toward each of the left and right fourth rear subframe-side attachment portions 104. In the illustrated embodiment, the second rear cross member 93 has a generally arcuate shape in plan view (bottom view) to be concave rearward, and the protrusion 93L is defined by the concave portion.

Figure 21:
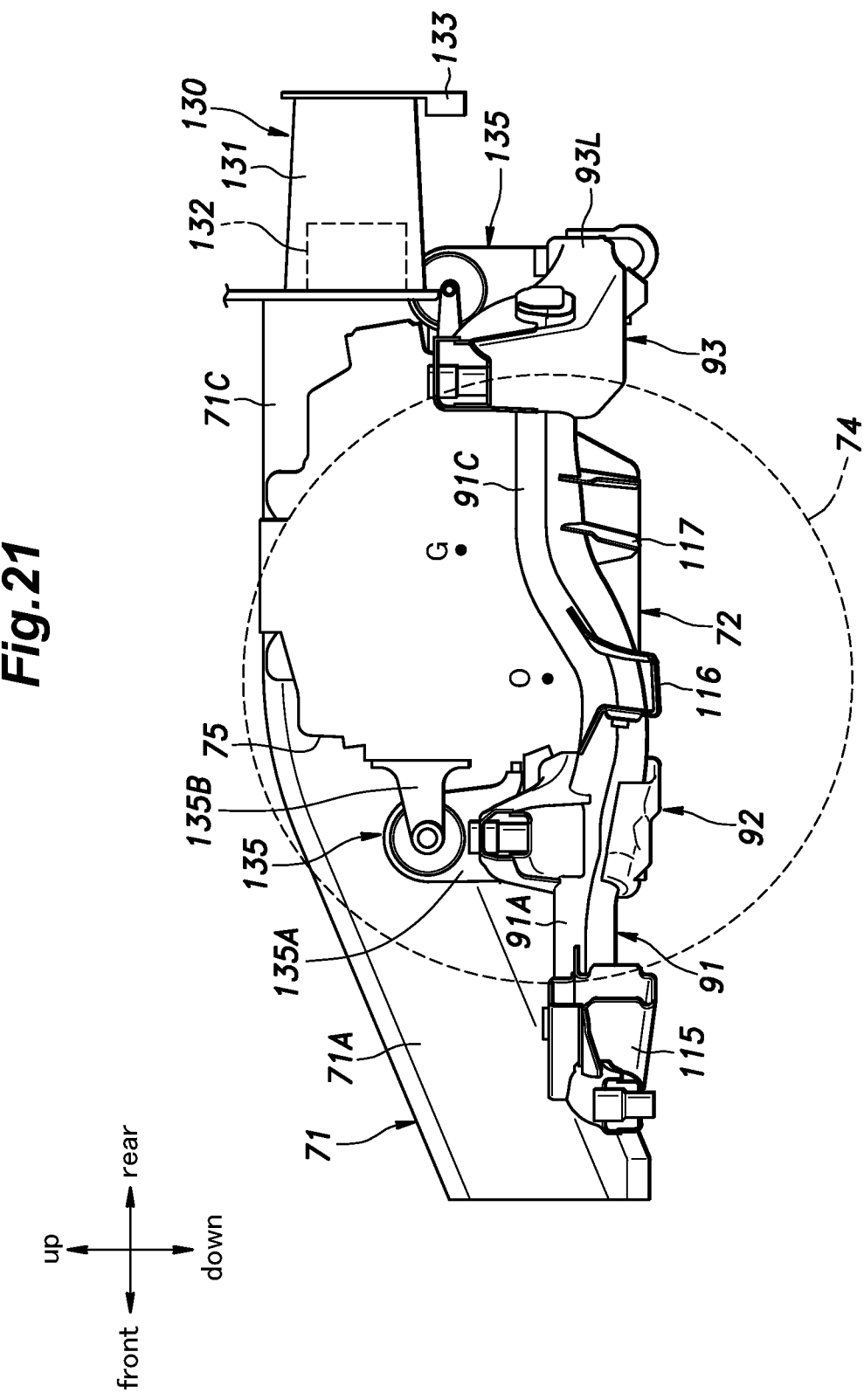
FIG. 21 is an explanatory diagram showing an arrangement of an electric motor in the rear part of the vehicle body structure.

As shown in FIG. 21, an electric motor 75 serving as a driving source is mounted on an upper side of the rear subframe 72. The electric motor 75 is supported by two mounts 135 provided on the first rear cross member 92 and one mount 135 provided on the second rear cross member 93. Each mount 135 includes s base 135A fastened to the first or second rear cross member 92, 93 and supporting a rubber bushing, and an arm 135B supported by the base via the rubber bushing and fastened to the electric motor 75.

The electric motor 75 is supported on the rear subframe 72 such that the rotation axis thereof extends laterally. The driving force of the electric motor 75 is transmitted to the rear wheels 74 via a transmission mechanism. The electric motor 75 is arranged such that the center of gravity G thereof is positioned rearward of the rotation axis O of the rear wheels 74. Namely, the electric motor 75 is placed in a rear-end portion of the vehicle 2.

The rear end of the protrusion 93L is positioned rearward of the rear end of the electric motor 75. The upper ends of the shock-absorbing structures 130 (the first shock-absorbing members 131) are positioned higher than the lower end of the electric motor 75, and the lower ends of the shock-absorbing structures 130 (the first shock-absorbing members 131) are positioned lower than the upper end of the electric motor 75. In other words, as seen in the fore-and-aft direction, the shock-absorbing structures 130 are arranged at positions overlapping the electric motor 75. Owing to the above arrangement, the load at the time of a rear collision is not applied directly to the electric motor 75 but is applied the second rear cross member 93 and at least one of the shock-absorbing structures 130.

As shown in FIG. 1, a battery 140 is disposed on the underside of the front floor panel 7 and the rear floor panel 78. In plan view (bottom view), the battery 140 is positioned in a region surrounded by the left and right side sills 3, the front subframe 6, and the rear subframe 72. Also, it can be said that the battery 140 is positioned in a region surrounded by the left and right side sills 3, the left and right front side frame inclined parts 4C, the left and right lateral extensions 4D, and the vehicle body cross member 77.

The battery 140 includes multiple battery cells connected to each other and a battery case containing the multiple battery cells therein. The battery case, which serves as an outer shell of the battery 140, is supported by multiple battery support members 143 extending between the left and right side sills 3.

In the following, the effects and advantages of the aforementioned embodiment will be described. In the vehicle body structure 1 according to the embodiment, a load at the time of a frontal collision is transmitted to the left and right side sills 3 via the left and right front side frames 4, and the transmission thereof to the battery 140 is suppressed. In addition, the front subframe 6 attached to the front side frames 4 absorbs the frontal collision load, whereby the load transmission to the battery 140 can be suppressed. A load in a rear collision is transmitted to the left and right side sills 3 via the left and right rear side frames 71, and the transmission thereof to the battery 140 is suppressed. Also, the rear subframe 72 attached to the rear side frames 71 absorbs the rear collision load, whereby the load transmission to the battery 140 can be suppressed. Since the battery 140 is positioned in a relatively large region surrounded by the left and right side sills 3, the front subframe 6, and the rear subframe 72, the battery 140 may have a large size.

The front subframe 6, on which the electric motor 75 is not mounted, breaks away from the rear-end supports 21 and moves downward when applied with a collision load, whereby the load transmission from the front subframe 6 to the battery 140 can be suppressed. Each guide member 19 abuts the rear end of the front subframe 6 at the slanted surface 19A thereof and guides the front subframe 6 to move downward in a reliable manner.

The load transmitting members 80 causes the load applied to the rear side frames 71 from the rear at the time of a rear collision to be dispersed to the side sills 3 and the vehicle body cross member 77, such that the deformation of the rear side frames 71 can be suppressed. Thereby, the rear side frames 71 can resist to the load at the time of a rear collision, and the electric motor 75 mounted on the rear subframe 72 can be protected properly. Each load transmitting member 80 forms a closed section structure in cooperation with the corresponding rear side frame 71 and the rear floor panel 78 such that the stiffness of the load transmitting member 80 is improved. The stiffness of the load transmitting member 80 is also improved by the partition wall 81 and the collar 85B. Thus, the load transmitting members 80 are provided with relatively high stiffness, and the third vehicle body-side attachment portions 85 are provided in these load transmitting members 80, whereby the rear subframe 72 can be supported highly stably. Because each load transmitting member 80 has a lateral width that increases gradually toward the front, the load applied to the rear side frames 71 can be dispersed over a wide range of the vehicle body cross member 77 owing to the load transmitting members 80.

A lateral load input from the first to third suspension arms 121-123 to the rear longitudinal members 91 is transmitted to the load transmitting members 80 and the rear side frames 71 via the first and second longitudinal member joint portions 92B, 93B, the first and second extensions 92C, 93C, and the third and fourth rear subframe-side attachment portions 103, 104 in this order. Therefore, the stiffness of the rear subframe 72 against the lateral load input from the suspension arms can be improved.

Since the second rear cross member 93 has the largest vertical width at each of the second longitudinal member joint portions 93B, the rear longitudinal members 91 can be supported reliably. Thereby, the rear longitudinal members 91 can sufficiently resist a relatively large lateral force in an early stage of the load input. Since the vertical width of each second extension 93C decreases gradually toward the laterally outward direction, the concentration of stress on the second extension 93C can be suppressed. By making the bend of the upper surface bent parts 93E more gentle than the bend of the lower surface bent parts 93H, the lateral force applied from the rear longitudinal members 91 to the second rear cross member 93 can be transmitted efficiently to the rear side frames 71.

The left and right front longitudinal members 23 of the front subframe 6 extend obliquely so as to approach each other toward the rear, and therefore, the load applied to the front subframe 6 at the time of a frontal collision can be transmitted in an inward direction obliquely relative to the left and right front side frames 4, whereby the load can be dispersed.

If a load is applied to the front longitudinal members 23 at the time of a frontal collision, the front longitudinal members 23 bend downward at the respective deformation promoting portions 53. As a result, stress is applied to the rear-end supports 21 and the bolts 29B, and the fastening structure between the rear end of each front longitudinal member 23 and the corresponding rear-end support 21 is disrupted so that the front subframe 6 can break away from the rear-end support 21 smoothly. Since the reinforcing plate 54, the front stabilizer support 56, the front cross member 24, and the front lower arm support 36 are provided in front of and behind each deformation promoting portion 53, the stiffness of the deformation promoting portion 53 is relatively low. Thereby, the stress tends to concentrate on the deformation promoting portion 53, and thus, the deformation preferentially starts from the deformation promoting portion 53.

Since the rear side frame bent parts 71B are positioned to a lateral side of the corresponding rear damper mounts 112, the rear side frame bent parts 71B are reinforced by the rear damper mounts 112, and the rear side frame bent parts 71B are made resistant to bending under the load at the time of a rear collision.

Because the rear ends of the shock-absorbing structures 130 protrude more rearward than the rear end of the rear subframe 72 (the protrusion 93L), the rear subframe 72 receives the load at the protrusion 93L thereof after the shock-absorbing structures 130 absorb the load. Therefore, when the collision load is relatively small, the load is absorbed by the deformation of the shock-absorbing structures 130 and is prevented from being easily transmitted to the rear subframe 72. Thus, the deformation of the rear subframe 72 is suppressed. On the other hand, when the collision load is large, the load is transmitted from the protrusion 93L to the rear subframe 72 so that the load applied to the rear side frames 71 can be dispersed.

When the collision load is relatively small, the load is absorbed by the first shock-absorbing members 131, and when the collision load is large, the load is absorbed by the second shock-absorbing members 132. Because the shock-absorbing structures 130 are positioned more rearward than the electric motor 75, the load at the time of a rear collision is applied to the electric motor 75 after being absorbed by the shock-absorbing structures 130.

Because the protrusion 93L of the second rear cross member 93, which forms the rear end of the rear subframe 72, is positioned more rearward than the rear end of the electric motor 75, a load in a rear collision is more likely to be applied to the rear subframe 72 than to the electric motor 75. Since the electric motor 75 is disposed on the rear part of the rear subframe 72, it is possible to secure a space in front of the electric motor 75. High voltage devices, such as a converter, can be mounted in the space. In addition, this space can be used as a space (escape space) into which the electric motor 75 can move at the time of a rear collision, whereby the collision between the battery 140 and the electric motor 75 can be suppressed. The cutout 88A provided in the lower edge of the rear panel 88 allows the protrusion 93L of the rear subframe 72 to protrude to the rear of the rear panel 88 without interfering with the rear panel 88.

By positioning the rear end of the protrusion 93L rearward of the rear ends of the rear side frames 71, the electric motor 75 can be disposed at a more rearward position in the vehicle body structure 1 so that a space can be secured in front of the electric motor 75. In addition, the load applied to the rear side frames 71 due to rear collision can be transmitted from the protrusion 93L to the rear subframe 72 so that the load applied to the rear side frames 71 can be dispersed.

Since the rear edge of the second rear cross member 93 extends from the protrusion 93L forward and laterally outward in an oblique manner toward each of the left and right fourth rear subframe-side attachment portions 104, the load applied to the central part of the second rear cross member 93 from the rear can be transmitted efficiently to the left and right rear side frames 71.

The protrusion 93L of the rear subframe 72 is positioned forward of the rear ends of the shock-absorbing structures 130 and rearward of the front ends of the same, the second rear cross member 93 receives the load at the protrusion 93L after the shock-absorbing structures 130 absorbs the load. Therefore, a relatively small collision load is absorbed by the shock-absorbing structures 130 and is prevented from being easily transmitted to the rear subframe 72. Thereby, the deformation of the rear subframe 72 is suppressed. On the other hand, when the collision load is large, the load is transmitted from the protrusion 93L to the rear subframe 72 so that the load applied to the rear side frames 71 can be dispersed.

The front subframe 6 in the present embodiment has the front lower arm supports 36 at parts thereof having an improved stiffness owing to the front cross member 24. Therefore, although the front longitudinal members 23 include the deformation promoting portions 53 and have a curved shape to widen a steering space for the front wheels 5, the front subframe 6 can be made resistant to deformation under a lateral force applied thereto via either lower arm 31. Thereby, ride comfort and driving performance can be improved. Because the front longitudinal members 23 can be curved laterally inward so that wide spaces in which the front wheels 5 are steered can be secured on laterally outer sides of the front subframe 6, it is possible to achieve a large steering angle range of the front wheels 5.

Because the front lower arm supports 36 are provided at portions of the front subframe 6 overlapping the front cross member 24 in the lateral direction, the front subframe 6 can be made even more resistant to deformation under the lateral force applied via either lower arm 31.

Since each front lower arm support 36 is joined to the corresponding front longitudinal member 23 and the front cross member 24, the stiffness of the front lower arm support 36 is improved. Thereby, the front subframe 6 can support the lower arms 31 reliably. In addition, this increases the difference in stiffness between the deformation promoting portion 53 of each front longitudinal member 23 and the part of the front longitudinal member 23 rearward of the deformation promoting portion 53 where the front cross member 24 and the front lower arm support 36 are provided, and therefore, the front longitudinal member 23 can deform reliably at the deformation promoting portion 53 at the time of a frontal collision.

Since each front lower arm support 36 is joined to the corresponding front side frame 4, the stiffness of the front lower arm support 36 is improved even further. In addition, the lateral force applied to the front lower arm support 36 from the corresponding lower arm 31 can be transmitted to the front side frame 4. Moreover, the slanted portion 36D of each front lower arm support 36 allows the load to be transmitted efficiently from the front longitudinal member 23 and the front cross member 24 to the front side frame 4. An end of the slanted portion 36D is positioned at a part of the front cross member 24 having stiffness improved by the collar 47, and therefore, the load can be transmitted efficiently from the front cross member 24 to each front side frame 4. Further, the steering gearbox 40 contributes to improving the stiffness of the front cross member 24.

The brace 26 improves the stiffness of the front subframe 6. Likewise, the front stabilizer 55 improves the stiffness of the front subframe 6. Owing to these features, the front subframe 6 can be made resistant to deformation under the lateral force applied thereto via either lower arm 31.

At the time of frontal collision, the front crash boxes 12 deform first to absorb the load, and therefore, when the collision load is small, the deformation promoting portion 53 is prevented from deforming. Thereby, replacement of the front subframe 6 can be avoided.

Concrete embodiments of the present invention have been described in the foregoing, but the present invention should not be limited by the foregoing embodiments and various modifications and alterations are possible within the scope of the present invention.

The invention claimed is:

1. A vehicle bodl3y rear structure, comprising:
   a pair of left and right rear side frames extending in a fore-and-aft direction in a rear part of a vehicle;
   a rear subframe attached to the rear side frames and supporting rear wheels via rear suspensions and an electric motor serving as a driving source for driving the rear wheels; and
   a pair of left and right shock-absorbing structures respectively provided at rear ends of the rear side frames and extending rearward,
   wherein the rear subframe includes a pair of left and right rear subframe longitudinal members extending in the fore-and-aft direction and a rear subframe cross member extending laterally and joined to the left and right rear subframe longitudinal members, the rear subframe cross member includes a protrusion that protrudes rearward in a laterally central part thereof, and a rear end of the protrusion is positioned more rearward than the rear ends of the rear side frames and rear end of the electric motor, and more forward than rear ends of the shock-absorbing structures.

2. The vehicle body rear structure according to claim 1, wherein each shock-absorbing structure includes a first shock-absorbing member extending rearward from the rear end of the corresponding rear side frame and a second shock-absorbing member extending rearward from the rear end of the corresponding rear side frame and having a fore-and-aft strength higher than that of the first shock-absorbing member, rear ends of the second shock-absorbing members are positioned more forward than rear ends of the first shock-absorbing members, and the rear end of the protrusion is positioned more forward than the rear ends of the second shock-absorbing members.

3. The vehicle body rear structure according to claim 2, wherein each first shock-absorbing member consists of a crash box extending rearward from the rear end of the corresponding rear side frame and having a rear end joined to a laterally extending bumper beam.

4. The vehicle body rear structure according to claim 1, further comprising a driving source for driving rear wheels, the driving source being mounted on an upper side of the rear subframe, wherein upper ends of the shock-absorbing structures are positioned higher than a lower end of the driving source, and lower ends of the shock-absorbing structures are positioned lower than an upper end of the driving source.

5. The vehicle body rear structure according to claim 1, wherein a rear edge of the rear subframe cross member extends from the protrusion forward and laterally outward in an oblique manner toward each of the left and right rear side frames.

6. A vehicle body rear structure, comprising:
a pair of left and right rear side frames extending in a fore-and-aft direction in a rear part of a vehicle;
a rear subframe attached to the rear side frames; and
a pair of left and right shock-absorbing structures respectively provided at rear ends of the rear side frames and extending rearward, wherein the rear subframe includes a pair of left and right rear subframe longitudinal members extending in the fore-and-aft direction and a rear subframe cross member extending laterally and joined to the left and right rear subframe longitudinal members, the rear subframe cross member includes a protrusion that protrudes rearward in a laterally central part thereof, a rear edge of the rear subframe cross member extends from the protrusion forward and laterally outward in an oblique manner toward each of the left and right rear side frames, and a rear end of the protrusion is positioned more rearward than the rear ends of the rear side frames and more forward than rear ends of the shock-absorbing structures.

7. The vehicle body rear structure according to claim 6, wherein each shock-absorbing structure includes a first shock-absorbing member extending rearward from the rear end of the corresponding rear side frame and a second shock-absorbing member extending rearward from the rear end of the corresponding rear side frame and having a fore-and-aft strength higher than that of the first shock-absorbing member, rear ends of the second shock-absorbing members are positioned more forward than rear ends of the first shock-absorbing members, and the rear end of the protrusion is positioned more forward than the rear ends of the second shock-absorbing members.

8. The vehicle body rear structure according to claim 7, wherein each first shock-absorbing member consists of a crash box extending rearward from the rear end of the corresponding rear side frame and having a rear end joined to a laterally extending bumper beam.

9. The vehicle body rear structure according to claim 6, further comprising a driving source for driving rear wheels, the driving source being mounted on an upper side of the rear subframe, wherein upper ends of the shock-absorbing structures are positioned higher than a lower end of the driving source, and lower ends of the shock-absorbing structures are positioned lower than an upper end of the driving source.

* * * * *